(12) United States Patent
Jung et al.

(10) Patent No.: US 10,536,021 B2
(45) Date of Patent: Jan. 14, 2020

(54) METHOD FOR CONTROLLING CHARGE FOR IMPROVING RECEIVE SENSITIVITY AND ELECTRONIC DEVICE FOR THE SAME

(71) Applicant: SAMSUNG ELECTRONICS CO., LTD., Suwon-si, Gyeonggi-do (KR)

(72) Inventors: Ku-Chul Jung, Suwon-si (KR); Sanghyun Ryu, Suwon-si (KR); Chulwoo Park, Hwaseong-si (KR); Kwangsub Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 103 days.

(21) Appl. No.: 15/494,722

(22) Filed: Apr. 24, 2017

(65) Prior Publication Data

US 2017/0346306 A1    Nov. 30, 2017

(30) Foreign Application Priority Data

May 27, 2016    (KR) ........................ 10-2016-0065847

(51) Int. Cl.
*H02J 7/00*        (2006.01)
*H02J 7/04*        (2006.01)
*H04W 88/02*       (2009.01)

(52) U.S. Cl.
CPC ............ *H02J 7/008* (2013.01); *H02J 7/0088* (2013.01); *H02J 7/042* (2013.01); *H02J 7/047* (2013.01); *H04W 88/02* (2013.01)

(58) Field of Classification Search
USPC ........................................................ 320/125
See application file for complete search history.

(56) References Cited

U.S. PATENT DOCUMENTS 6,476,683 B1 * 11/2002 Saito ..................... H02M 3/155
                                                    315/291
2013/0021003 A1   1/2013 Okamoto
2014/0159687 A1   6/2014 Lee
2015/0214769 A1   7/2015 Kim et al.

FOREIGN PATENT DOCUMENTS

| JP | 2008-131812 | 6/2008 |
| JP | 2013-027153 | 2/2013 |
| KR | 20-0431523 | 11/2006 |
| KR | 10-2014-0074009 | 6/2014 |
| KR | 10-2015-0089858 | 8/2015 |
| KR | 10-2015-0117415 | 10/2015 |

* cited by examiner

*Primary Examiner* — Samuel Berhanu
(74) *Attorney, Agent, or Firm* — Nixon & Vanderhye P.C.

(57) ABSTRACT

An electronic device and a method thereof are provided. The electronic device includes a memory, a battery, a charging circuit for charging the battery using current supplied from a power supply device, a slew rate variable circuit electrically connected to the charging circuit, and a processor electrically connected to the memory, the battery, the charging circuit, and the slew rate variable circuit. The processor is configured to control the charging circuit to control the charging of the battery, to monitor a state of the electronic device during battery charging, and to control the slew rate variable circuit based on the state of the electronic device to change a slew rate related to the battery charging.

17 Claims, 19 Drawing Sheets

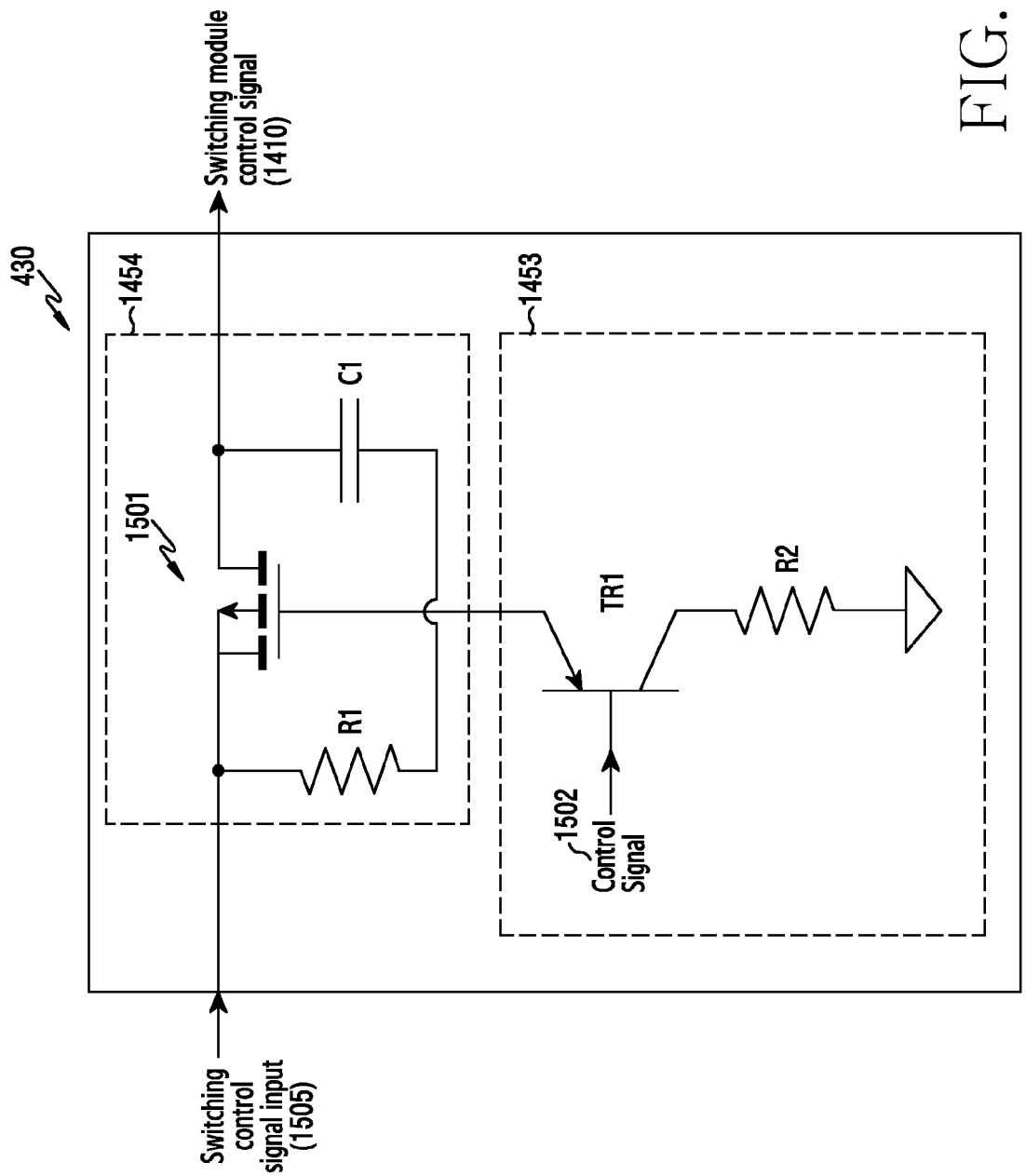

METHOD FOR CONTROLLING CHARGE FOR IMPROVING RECEIVE SENSITIVITY AND ELECTRONIC DEVICE FOR THE SAME

CROSS-REFERENCE TO RELATED APPLICATION

This application is based on and claims priority under 35 U.S.C. § 119 to a Korean patent application filed in the Korean Intellectual Property Office on May 27, 2016 and assigned Serial No. 10-2016-0065847, the disclosure of which is incorporated by reference herein in its entirety.

BACKGROUND

1. Field of the Disclosure

The present disclosure relates generally to a method and apparatus for controlling charging to improve receive sensitivity.

2. Description of Related Art

Recently, with the development of digital technologies, various types of electronic devices such as a mobile communication terminal, a Personal Digital Assistant (PDA), an electronic organizer, a smart phone, a tablet Personal Computer (PC), a wearable device, or the like are widely used. Such an electronic device has various functions such as a voice call, message transmission (e.g., a Short Message Service (SMS)/Multimedia Message Service (MMS), etc.), a video call, an electronic organizer, image capturing, e-mail transmission/reception, broadcast reproduction, Internet, music reproduction, scheduling, a Social Networking Service (SNS), a messenger, a dictionary, games, or the like.

The electronic device uses a battery for portability. The battery of the electronic device requires charging, and an amount of battery consumption is increased since the electronic device performs various functions. To deal with the increase in battery consumption, a battery capacity of the electronic device may be increased. However, the increase in the battery capacity may lead to a problem in that a battery charging time is increased. To solve this problem, battery charging efficiency may be increased to decrease the battery charging time.

A slew rate needs to be increased as much as possible in order to increase charging efficiency. However, if the slew rate is high, the charging efficiency is increased, whereas receive sensitivity may deteriorate since a harmonic component is generated due to a switching node. However, if the slew rate is decreased, the charging efficiency deteriorates, and as a result, a charging time may be increased, or heat may be generated in the electronic device. An optimal slew rate may be set in the electronic device on the basis of the charging efficiency and the receive sensitivity. In other words, conventionally, the slew rate is set in advance in the electronic device, and the slew rate cannot be changed.

SUMMARY

Various example embodiments may provide a method and apparatus for changing a slew rate based on a state of an electronic device.

According to various example embodiments, the electronic device may include a memory, a battery, a charging circuit configured to charge the battery using current supplied from a power supply device, a slew rate variable circuit electrically connected to the charging circuit, and a processor electrically connected to the memory, the battery, the charging circuit, and the slew rate variable circuit. The processor may be configured to control the charging circuit to control the charging of the battery, to monitor a state of the electronic device during battery charging, and to control the slew rate variable circuit based on the state of the electronic device to change a slew rate related to the battery charging.

According to various example embodiments, a method of operating the electronic device may include monitoring a state of the electronic device during battery charging of the electronic device, determining whether the state of the electronic device corresponds to a slew rate change condition, and changing the slew rate related to the battery charging if the state corresponds to the slew rate change condition.

According to various example embodiments, the slew rate may be changed by monitoring the state of the electronic device.

According to various example embodiments, the slew rate may be decreased during communication to improve receive sensitivity.

According to various example embodiments, if a call is in progress, the battery of the electronic device may be charged by decreasing the slew rate, thereby increasing receive sensitivity efficiency.

According to various example embodiments, if a call is not in progress, the battery of the electronic device may be charged by increasing the slew rate, thereby increasing battery charging efficiency.

BRIEF DESCRIPTION OF THE DRAWINGS

The above and other aspects, features and attendant advantages of the present disclosure will be apparent and more readily appreciated from the following detailed description, taken in conjunction with the accompanying drawings, in which like reference numerals refer to like elements, and wherein:

FIGS. 15A, 15B, 15C and 15D are diagrams illustrating examples of a slew rate variable circuit according to various example embodiments.

DETAILED DESCRIPTION

Figure 1:
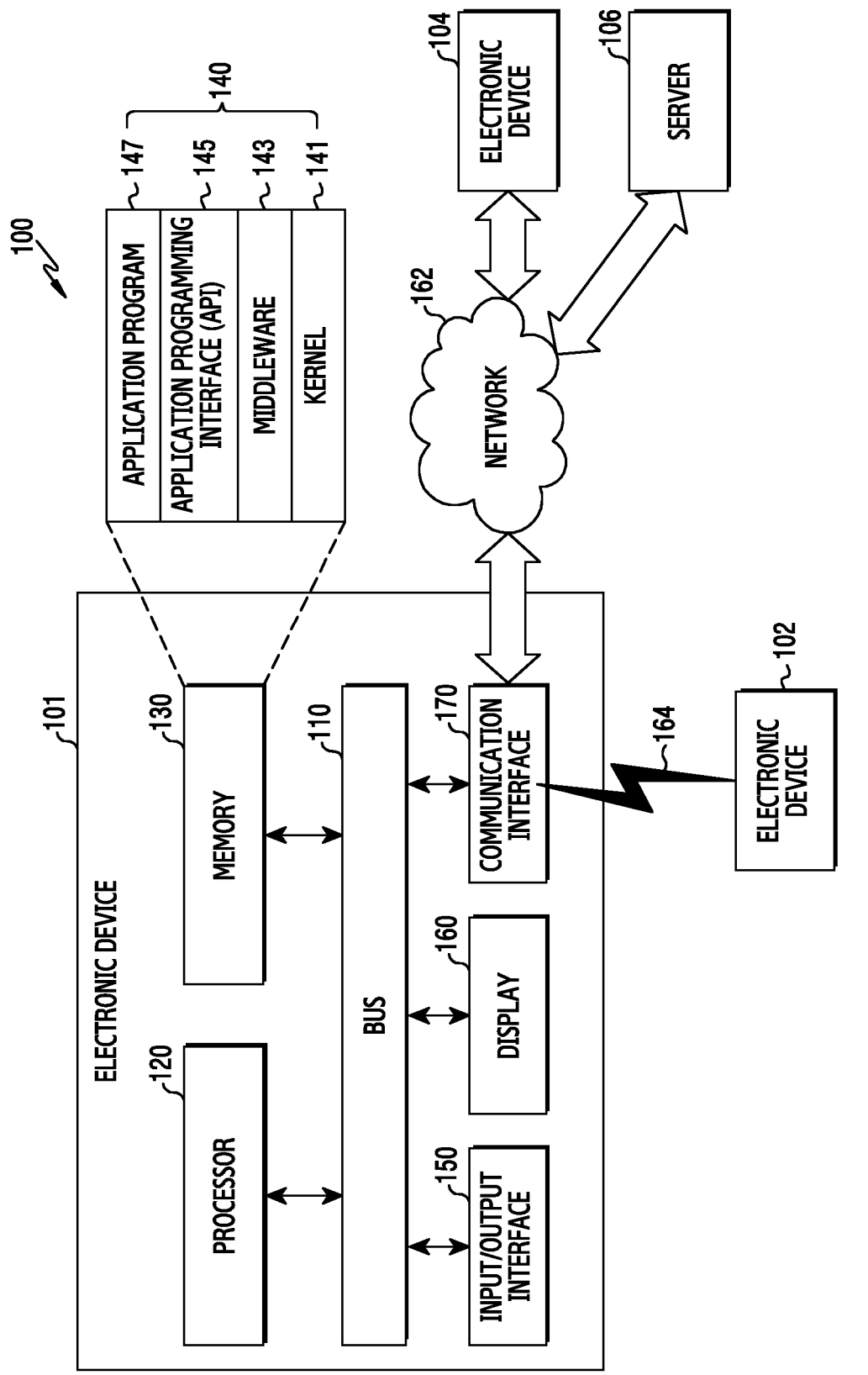
FIG. 1 is a diagram illustrating an example electronic device in a network environment according to various example embodiments.

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of embodiments of the present disclosure. In describing the drawings, similar reference numerals may be used to designate similar constituent elements. As used herein, the expression "have", "may have", "include", or "may include" refers to the existence of a corresponding feature (e.g., numeral, function, operation, or constituent element such as component), and does not exclude one or more additional features. In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B. The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer to a situation in which the device, together with other devices or components, "is able to". For example, the phrase "processor adapted (or configured) to perform A, B, and C" may refer, for example, to a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

The terms used in the present disclosure are used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even when the term is defined in the present disclosure, it should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram illustrating an example network environment including an example electronic device according to various example embodiments of the present disclosure.

An electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including interface circuitry) 150, a display 160, and a communication interface (e.g., including communication circuitry) 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include various processing circuitry, such as, for example, and without limitation, one or more of a dedicated processor, a Central Processing Unit (CPU), an Application Processor (AP), and a Communication Processor (CP). The processor 120 may carry out, for example, calculation or data processing relating to control and/or communication of at least one other component of the electronic device 101. The processor 120 may display a plurality of objects for executing at least one application through the display 160, wherein each of the plurality of objects has a second form corresponding to a first form of the display and has at least a part thereof overlapping with another object, and display, through the display 160, an execution screen of an application corresponding to an object which is selected from among the plurality of objects in response to an input.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data. Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may include various interface circuitry and function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may include various communication circuitry and establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication may include, for example, short range communication 164.

The short-range communication 164 may include at least one of, for example, Wi-Fi, Bluetooth, Near Field Communication (NFC), and Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various example embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
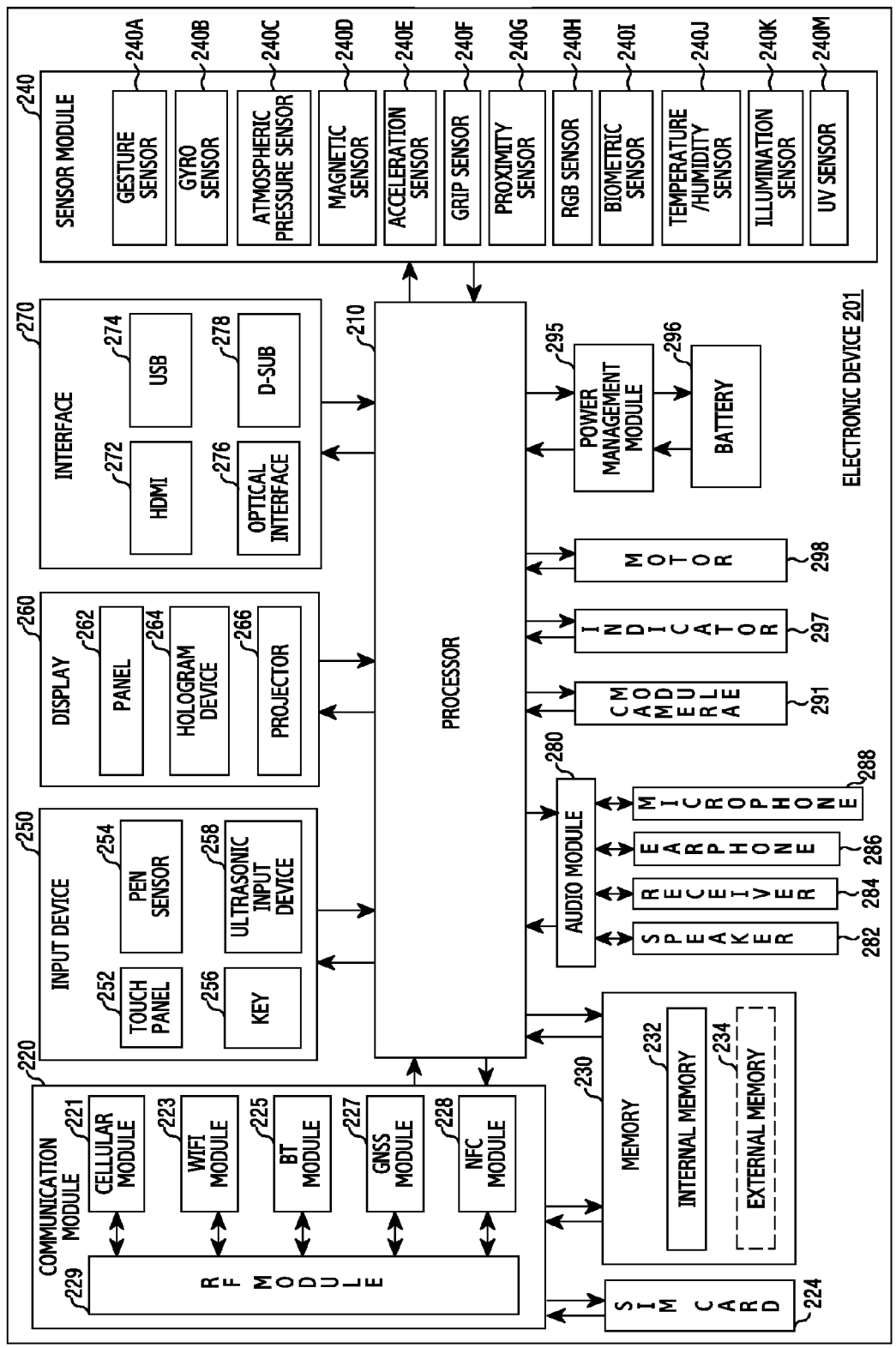
FIG. 2 is a block diagram illustrating an example structure of an electronic device according to various example embodiments.

FIG. 2 is a block diagram illustrating an example electronic device according to various example embodiments of the present disclosure.

The electronic device 201 may include, for example, all or a part of the electronic device 101 illustrated in FIG. 1. The electronic device 201 may include one or more processors (e.g., including processing circuitry) 210 (e.g., Application Processors (AP)), a communication module (e.g., including communication circuitry) 220, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227 (e.g., a GPS module 227, a Glonass module, a Beidou module, or a Galileo module), an NFC module 228, and a Radio Frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using a subscriber identification module (e.g: SIM card) 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 an/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance (e.g., light) sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
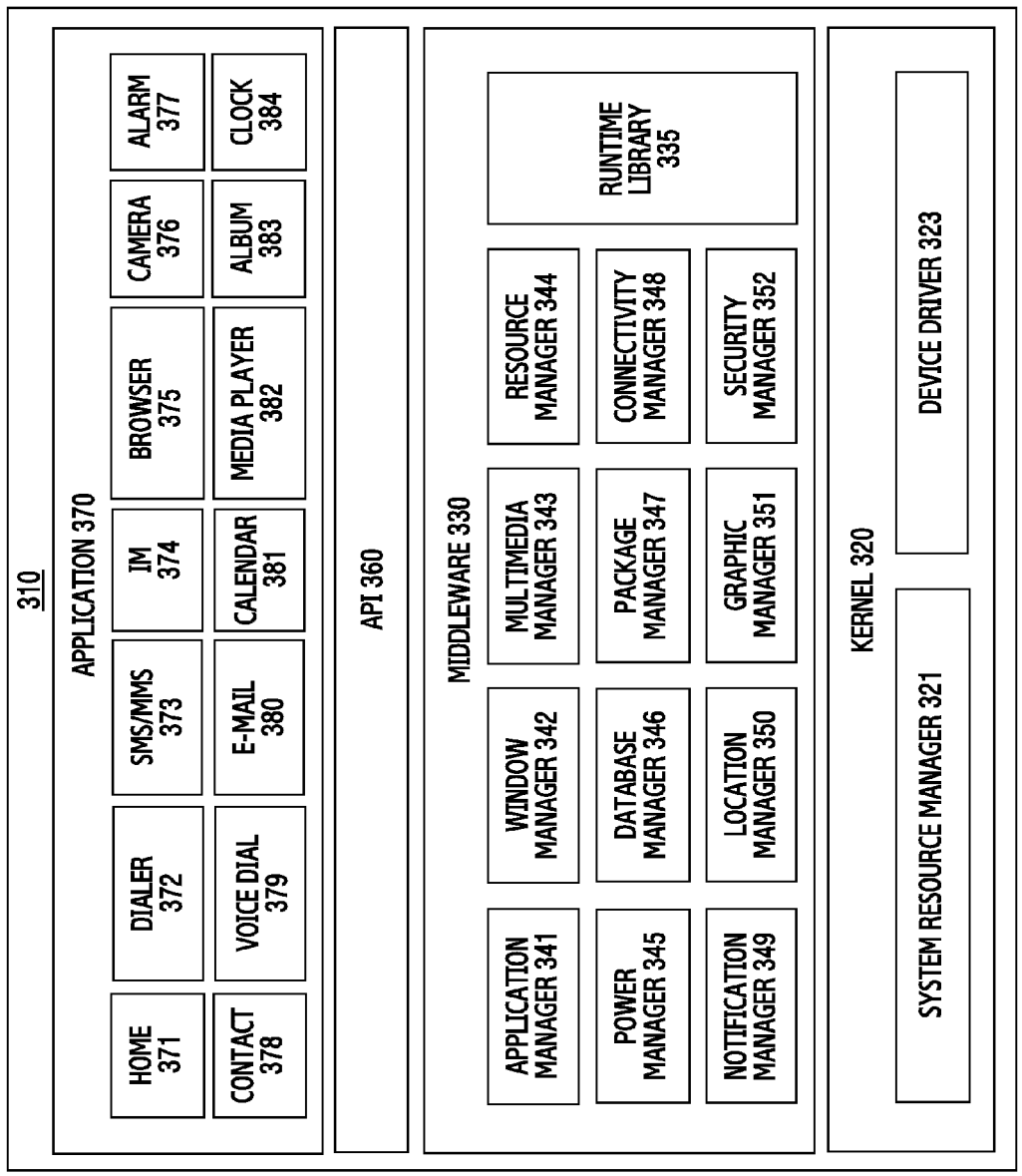
FIG. 3 is a block diagram illustrating an example program module according to various example embodiments.

FIG. 3 is a block diagram illustrating an example program module according to various example embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter. According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

Figure 4:
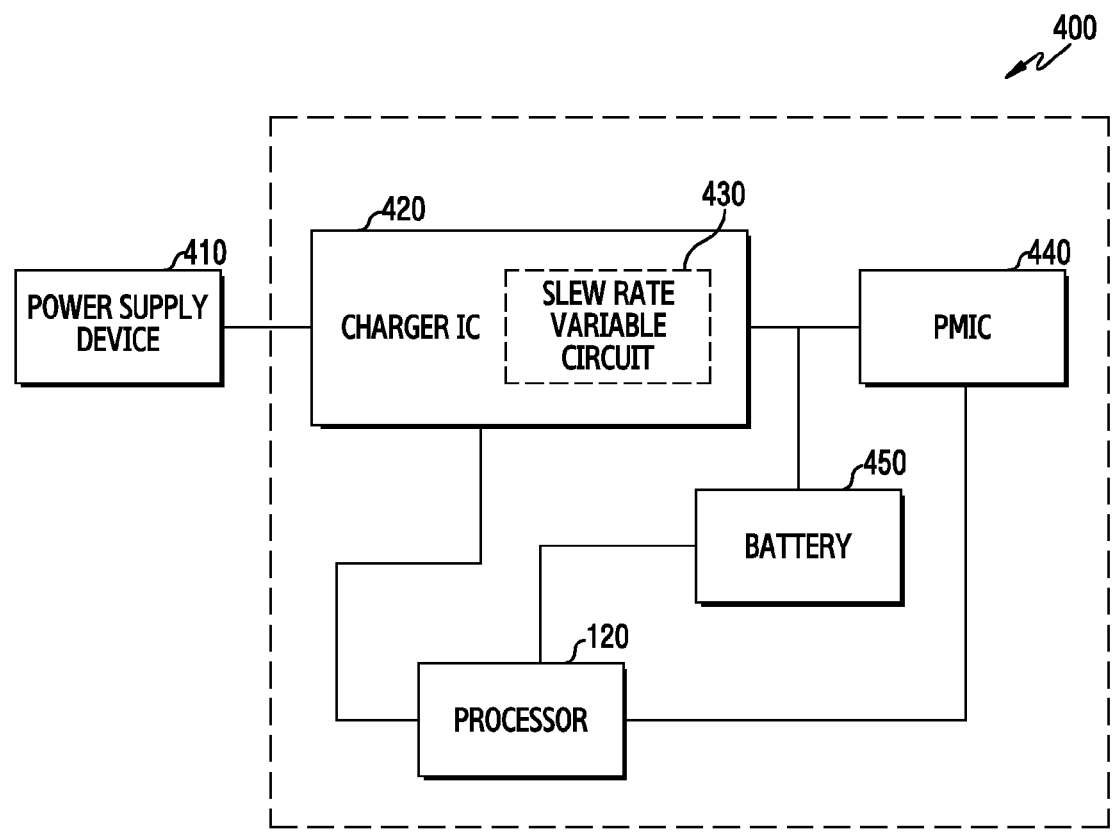
FIG. 4 is a block diagram illustrating an example structure related to battery charging of an electronic device according to various example embodiments.

FIG. 4 is a block diagram illustrating an example structure related to battery charging of an electronic device according to various example embodiments.

Referring to FIG. 4, an electronic device 400 may include a processor (e.g., including processing circuitry) 120, a charging circuit (or a charger Integrated Circuit (IC)) 420, a slew rate variable circuit 430, a Power Management Integrated Circuit (PMIC) 440, and a battery 450. In FIG. 4, a power supply device 410 may not be included in the electronic device 400, and may be illustrated to facilitate understanding of the disclosure. The processor 120 may control the charger IC 420, the slew rate variable circuit 430, the PMIC 440, or the battery 450. The electronic device 400 of FIG. 4 may be identical or similar to the electronic device 101 of FIG. 1 or the electronic device 201 of FIG. 2.

The power supply device 410 may be a device for supplying power to the electronic device 400 to charge the battery 450 of the electronic device 400. The power supply device 410 may provide various levels of voltage or current, and may include a wired power supply device or a wireless power supply device. For example, if the power supply device 410 is the wired power supply device, the power supply device 410 may be connected to the electronic device 400 through an interface (e.g., the interface 270) in the electronic device 400. When connected to the electronic device 400, the power supply device 410 may provide information on the various levels of voltage (or current) that can be provided by the power supply device 410 to the electronic device 400. The power supply device 410 may be a typical power supply device or a high-speed power supply device according to one example embodiment. For example, the typical power supply device may supply power with 5V/500 mA. In addition, the high-speed power supply device has a faster charging speed than the typical power supply device, and may provide power with higher voltage (e.g., 9V/1.5 A) than the typical power supply device.

The charger IC 420 is a circuit for controlling the charging of the electronic device 400, and for example, may determine charging voltage of the electronic device 400. The charger IC 420 may control the charging of the battery 450, or may provide control such that required power is provided to each of constitutional elements (e.g., the processor 120, the PMIC 440, etc.) included in the electronic device 400. For example, when the power supply device 410 is connected, the charger IC 420 may provide current (or voltage) supplied from the power supply device 410 to the PMIC 440 and the battery 450. If it is recognized that the power supply device 410 is connected to the interface of the electronic device 400, the charger IC 420 may form an electrical path with respect to the power supply device 410. If the electrical path is formed with respect to the power supply device 410, the charger IC 420 may operate in a charging mode.

According to various example embodiments, when in the charging mode (or a buck mode), the charger IC 420 may rectify current (or voltage) supplied from the power supply device 410 and provide it to the PMIC 440 and the battery 450. For example, the charger IC 420 may convert voltage to Direct Current (DC) voltage when the voltage supplied from the power supply device 410 is Alternating Current (AC) voltage, or may decrease voltage according to battery charging voltage when the voltage supplied from the power supply device 410 is higher than the battery charging voltage. In addition, if the power supply device 410 is not connected, the charger IC 420 may provide power to the PMIC 440 by using voltage stored in the battery 450. If the power supply device 410 is not connected, the charger IC 420 may be in a non-charging mode (or a boost mode). For example, the charger IC 420 may boost the voltage stored in the battery 450 and provide it to the PMIC 440.

According to various example embodiments, the charger IC 420 may include the slew rate variable circuit 430. According to one example embodiment, the slew rate variable circuit 430 may be disposed between the charger IC 420 and the PMIC 440. For example, the slew rate variable circuit 430 may be disposed in a path on which current output from the charger IC 420 is provided to the PMIC 440 or the battery 450. Alternatively, according to one example embodiment, the slew rate variable circuit 430 may include a buck/boost controller of the charger IC 420. The slew rate variable circuit 430 may control current supplied from the charger IC 420 to the PMIC 440 or the battery 450. For example, a slew rate needs to be increased as much as possible in order to increase charging efficiency. However, if the slew rate is high, the charging efficiency is increased, whereas receive sensitivity may deteriorate since a harmonic component is generated due to a switching node. Conventionally, one fixed slew rate (e.g., 100%, 97%, etc.) is set in advance in the electronic device, and the set slew rate cannot be changed. Herein, the slew rate may be an increased amount of an output signal (e.g., output current) per unit time with respect to a change in an input signal (e.g., supplied current).

For example, in a case where the voltage (or current) output from the charger IC 420 is 10V (or 2 A), if 10V is provided directly to the PMIC 440 and the battery 450, the slew rate may be 100%. That is, when the slew rate is high, an input voltage value and an output voltage value may be almost the same. Herein, the input voltage value may be a voltage value output from the charger IC 420, and the output voltage value may be a voltage value provided to the PMIC 440 and the battery 450. In this case, although charging efficiency is increased since current provided to the battery 450 is high, a harmonic component may be generated since current supplied to the PMIC 440 is also high. That is, if current provided to the battery 450 per unit time is high, a charging time of the battery 450 is decreased and thus charging efficiency may be high. However, since a harmonic component is generated on a path for delivery to the PMIC 440, it may have an effect on the entire circuit in the electronic device 400. For example, if the harmonic component is generated when the electronic device 400 is charged, there may be a problem in that receive sensitivity (or Received Signal Strength Indication (RSSI)) is decreased.

Therefore, the slew rate variable circuit 430 may control current (or an amount of current) output from the charger IC 420 to change the slew rate. When the slew rate is decreased, charging efficiency of the battery 450 is decreased. However, since a harmonic component is not generated on a path for delivery to the PMIC 440, it is possible to avoid deterioration in receive sensitivity of the electronic device 400. That is, the slew rate variable circuit 430 may change the slew rate according to a state of the electronic device 400, and thus may increase charging efficiency of the battery 450 while improving the receive sensitivity of the electronic device 400. For this, the slew rate variable circuit 430 may be constructed of a switching circuit for controlling current (or voltage) output from the charger IC 420. For example, the slew rate variable circuit 430 may be a current (voltage) regulator circuit or a snubber circuit.

The PMIC 440 may manage power of the electronic device 400. According to one example embodiment, the PMIC 440 may be a Power Management Integrated Circuit (PMIC). The battery 450 may include a rechargeable battery and/or a solar cell. The battery 450 may be the battery 292 of FIG. 2. The battery 450 may be attachable/detachable from the electronic device 400.

Although not shown, the electronic device 400 may optionally further include a battery gauge or a boosting circuit in association with battery charging. The battery gauge may be directly connected to the battery 450. The battery gauge may measure the remaining amount of the battery 450 and voltage, current, or temperature during the charging.

Figure 5:
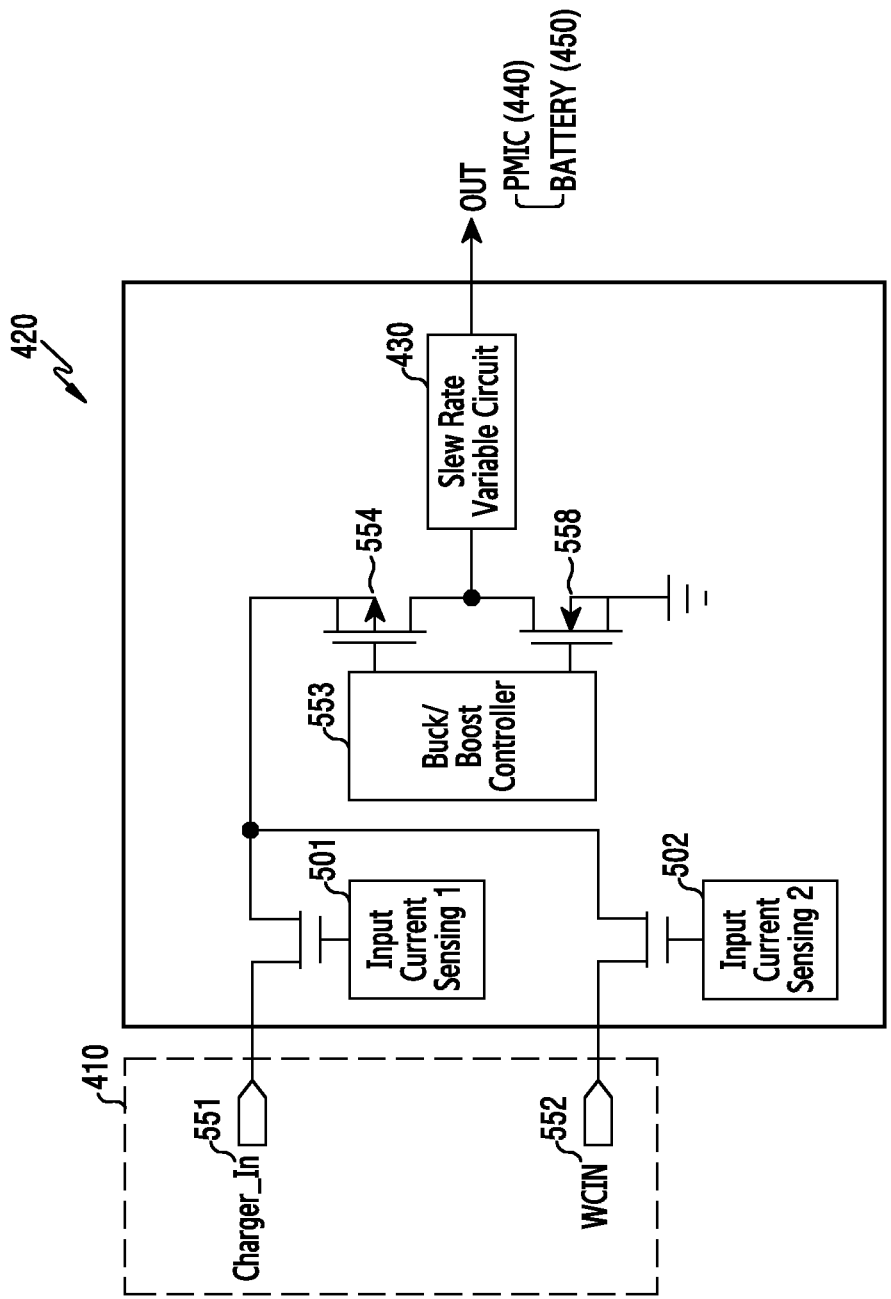
FIG. 5 is a diagram illustrating an example of a charger Integrated Circuit (IC) according to various example embodiments.

FIG. 5 is a diagram illustrating an example of a charger IC according to various example embodiments.

Referring to FIG. 5, the charger IC 420 may include a charger_in circuit 551, an input current sensing-1 circuit 501, a Wireless Charger_In (WCIN) circuit 552, an input current sensing-2 circuit 502, a buck/boost controller 553, a switching module-1 (e.g., including switching circuitry) 554, a switching module-2 (e.g., including switching circuitry) 558, and the slew rate variable circuit 430. The charger IC 420 may be controlled by the processor 120. An example of the charger IC 420 of FIG. 5 is only intended to facilitate understanding of the description of various example embodiments, and thus the charger IC 420 is not limited to FIG. 5.

The charger_in 551 may be a connection node for forming an electrical path with respect to the power supply device 410. For example, if the power supply device 410 is a wired power supply device, the charger_in 551 may receive current supplied from the wired power supply device. The input current sensing-1 501 may be a switching module which switches on/off current (or voltage) input to the charger_in 551 to generate AC current or create DC current. Alternatively, the input current sensing-1 501 may be a current limiter. The electronic device 400 may limit maximum voltage or maximum current to prevent overvoltage. The input current sensing-1 501 may limit current to prevent a circuit of the electronic device 400 from being damaged due to the current input to the charger_in 551.

The WCIN 552 may be the connection node for forming the electrical path with respect to the power supply device 410. For example, if the power supply device 410 is a wireless power supply device, the WCIN 552 may be a node for receiving current supplied from the wireless power supply device. The input current sensing-2 502 may be a switching module which switches on/off current (or voltage) input to the WCIN 552 to generate AC current or create DC current. Alternatively, the input current sensing-2 502 may be a current limiter which limits current input to the WCIN 552 to prevent a circuit of the electronic device 400 from being damaged.

The buck/boost controller 553 may include various circuitry used to freely use voltage (or current) to be supplied, and may be, for example, a switching regulator (e.g., a DC-DC converter). The buck/boost controller 553 may switch a mode of the charger IC 420 to a charging mode or a non-charging mode. For example, the buck/boost controller 553 may recognize that the power supply device 410 is connected to the electronic device 400 via the charger_in 551 or the WCIN 552. If it is recognized that the power supply device 410 is connected to the charger_in 551 or the WCIN 552, the buck/boost controller 553 may provide control in regards that the charger IC 420 operates in the charging mode (or a buck mode). Alternatively, if the power supply device 410 is not connected to the electronic device 400, the buck/boost controller 553 may provide control in regards that the charger IC 420 operates in the non-charging mode (or a boost mode). If the charger IC 420 operates in the charging mode, the buck/boost controller 553 may decrease voltage supplied from the power supply device 410 according to battery charging voltage, or may convert it to DC current (or voltage). For example, the buck/boost controller 553 may convert current supplied from the power supply device 410 to DC current (or voltage) while turning on/off the circuitry of switching module-1 554 and the circuitry of switching module-2 558. Herein, the switching module-1 554 and the switching module-2 558 may include various switching circuitry which, for example, and without limitation, may be constructed of a P-channel Metal Oxide Silicon Field Effect transistor (MOSFET). Alternatively, if the charger IC 420 is operating in the non-charging mode, the buck/boost controller 553 may boost the voltage stored in the battery 450 and provide it to the PMIC 440.

Current output from the buck/boost controller 553 may be provided to the slew rate variable circuit 430. The slew rate variable circuit 430 may control the current output from the buck/boost controller 553 to provide the current to the PMIC 440 and the battery 450. That is, the current output (e.g., Out) from the slew rate variable circuit 430 may be provided to the PMIC 440 and the battery 450.

According to various example embodiments, the slew rate variable circuit 430 may be connected to an output node of the buck/boost controller 553 inside the charger IC 420. According to various example embodiments, the slew rate variable circuit 430 may be included in a portion of the buck/boost controller 553 inside the charger IC 420.

Figure 6:
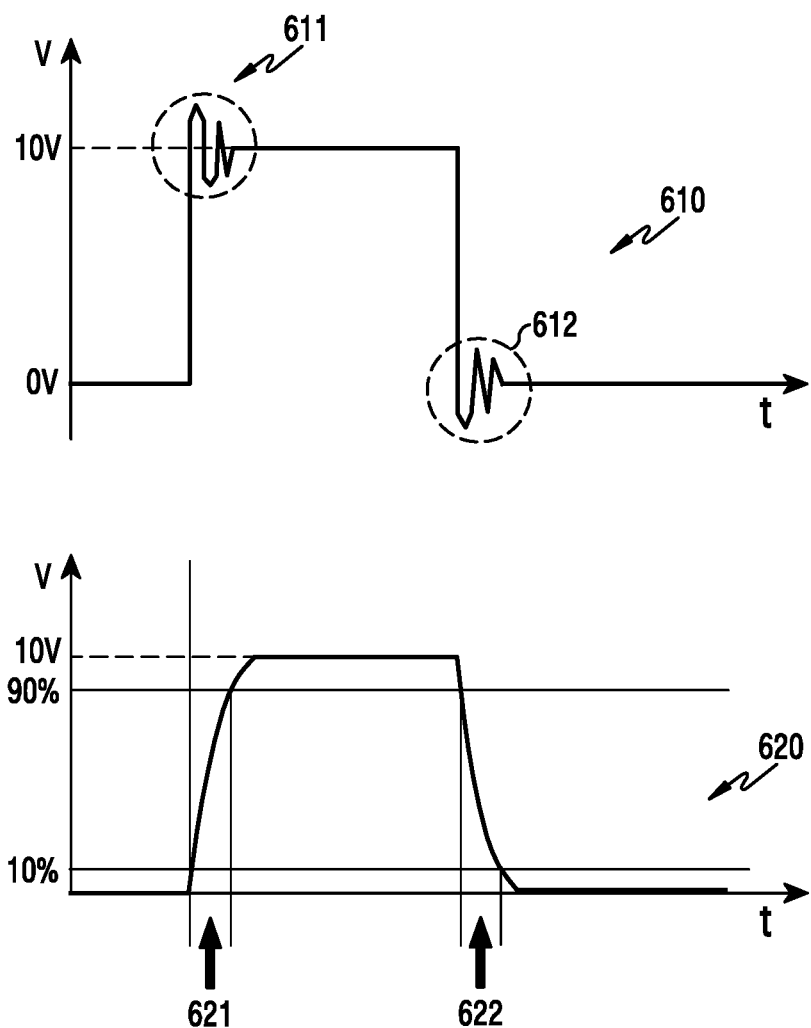
FIG. 6 is a diagram including graphs illustrating an example of a slew rate according to various example embodiments.

FIG. 6 is a diagram including graphs illustrating an example of a slew rate according to various example embodiments.

Referring to FIG. 6, a reference numeral 610 is a graph showing a signal waveform when the slew rate is 100% (e.g., a first slew rate). The signal waveform of the reference numeral 610 shows a voltage waveform output from the charger IC 420. For example, the signal waveform of the reference numeral 610 may be generated at an output node (e.g., an input node of the slew rate variable circuit 430) towards the buck/boost controller 553 inside the charger IC 420 of FIG. 5. When a supply voltage value supplied from the power supply device 410 is 10V, noises 611 and 612 may be generated if the supply voltage is directly supplied as output voltage of the charger IC 420. That is, the reference numeral 610 may be a signal waveform which appears when the electronic device 400 is charged according to a pre-set slew rate for charging without having to change the slew rate. Therefore, if the noises 611 and 612 are generated at the output node towards the buck/boost controller 553 in the charger IC 420, it may affect other constitutional elements inside the electronic device 400 connected to the charger IC 420.

According to various example embodiments, the slew rate may be adjusted in the slew rate variable circuit 430 to remove the noises 611 and 612. A reference numeral 620 represents a graph showing a signal waveform when a slew rate is adjusted, for example, to 90% (e.g., a second slew rate). Referring to the reference numeral 620, if the supply voltage value supplied from the power supply device 410 is 10V, the supply voltage is not directly provided as the output voltage of the charger IC 420, and if the output voltage is provided by being decreased, a noise may not be generated. By reference, in order to decrease the output voltage by using the supply voltage, an amount of current output over time may be decreased. If the amount of current output over time is decreased, a delay may occur in comparison with the supply voltage. That is, when the reference numeral 610 is compared with the reference numeral 620, it can be seen that an amount of change in the signal waveform over time (e.g., a maximum value 621 and a minimum value 622) is different.

For example, the slew rate variable circuit 430 may control voltage supplied to the PMIC 440 and the battery 450 by using voltage output from the charger IC 420. However, if the slew rate is decreased to remove the noise, charging efficiency of the battery may be decreased. Therefore, according to example embodiments of the present disclosure, it is possible to appropriately change the slew rate to increase the charging efficiency of the battery without having to generate the noise at the time of charging according to the state of the electronic device 400.

Figure 7A:
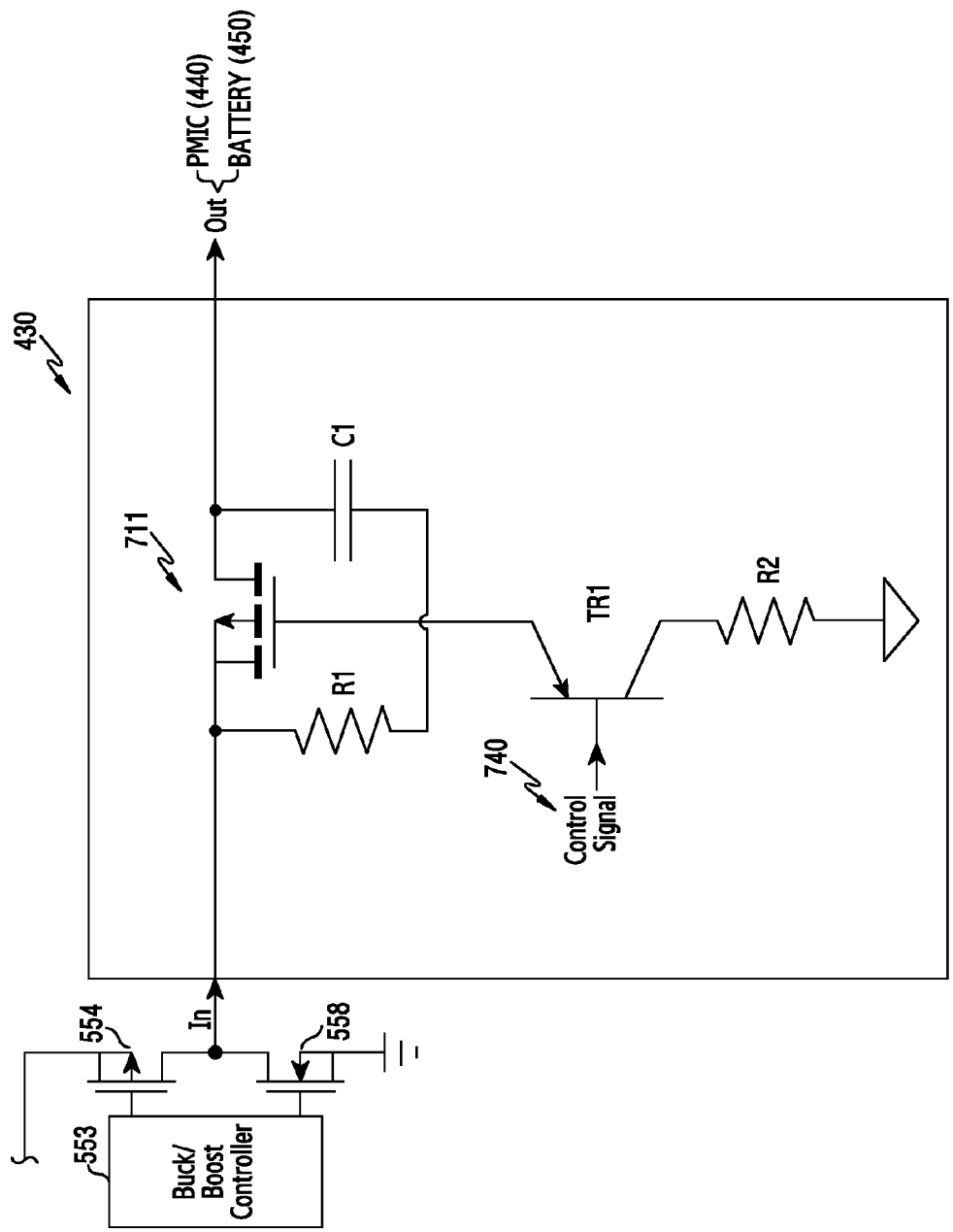
FIG. 7A and FIG. 7B are diagrams illustrating examples of a slew rate variable circuit according to various example embodiments.
Figure 7B:
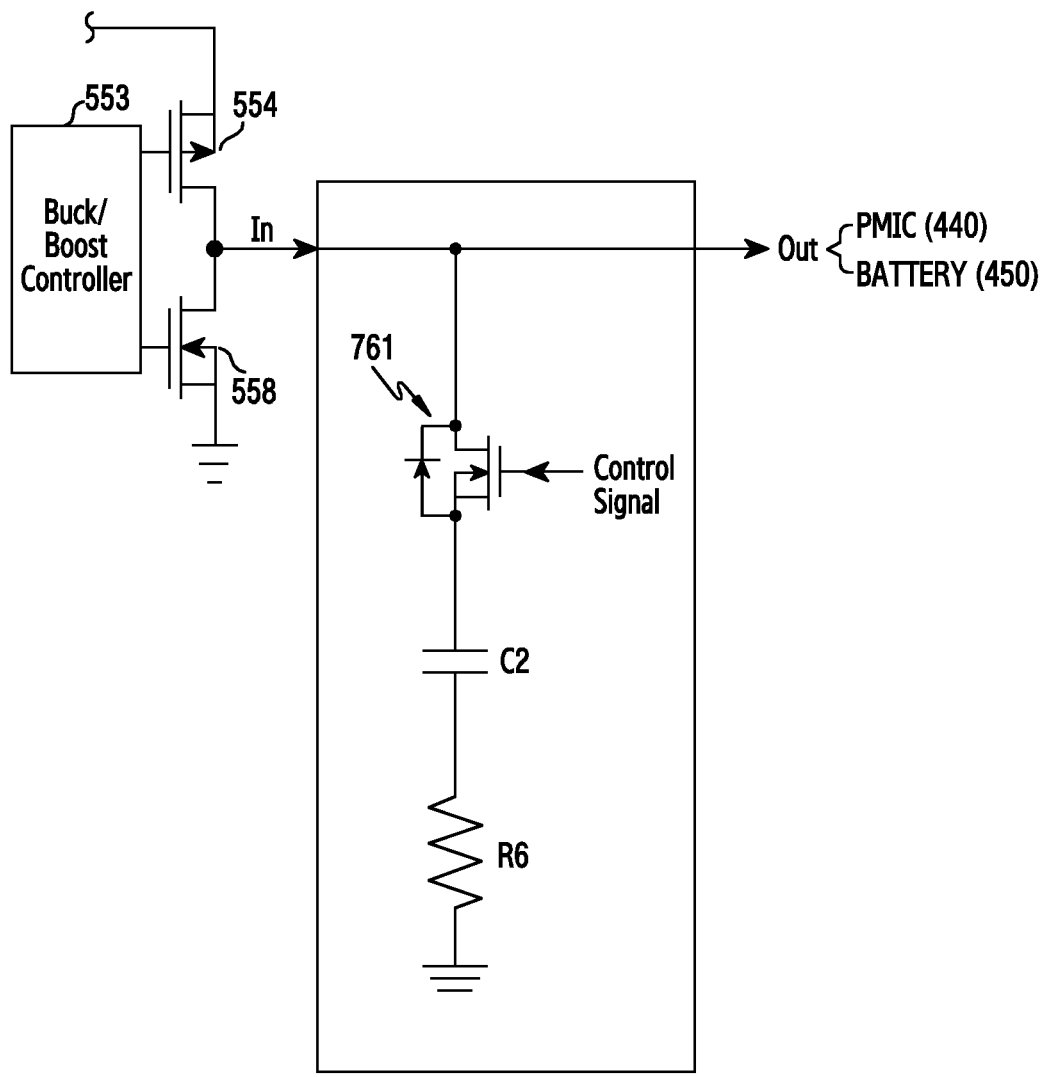

FIG. 7A and FIG. 7B are diagrams illustrating examples of a slew rate variable circuit according to various example embodiments.

The slew rate variable circuit 430 described hereinafter is disposed, for example (e.g., FIG. 5), on a path on which current is output from the buck/boost controller 553 inside the charger IC 420.

FIG. 7A illustrates an example of a slew rate variable circuit 430 using a transistor.

Referring to FIG. 7A, the slew rate variable circuit 430 may output (e.g., Out) current supplied (e.g., In) from the buck/boost controller 553 under the control of a switching module 711. For example, the supply current (e.g., In) may be supplied from an output node of the buck/boost controller 553. The output current (e.g., Out) may be output to the PMIC 440 and the battery 450. For example, the switching module 711 may be a P-channel MOSFET chip. The slew rate variable circuit 430 may turn on/off the switching module 711 according to a control signal 740 of the processor 120. For example, if the switching module 711 is off, current output from the buck/boost controller 553 may be delivered to the PMIC 440 and the battery 450 via a resistor-1 R1 and a capacitor-1 C1. If the switching module 711 is on, the current output from the buck/boost controller 553 may be delivered to the PMIC 440 and the battery 450 via a resistor-2 R2, a transistor-1 TR1 (e.g., a P-type transistor).

For example, the slew rate variable circuit 430 may turn on/off the switching module 711 by turning on/off the transistor-1 TR1 (e.g., the P-type transistor) according to the control signal 740. The slew rate variable circuit 430 may adjust a duty cycle for turning on/off the switching module 711 by using the transistor-1 TR1, and thus may create desired output current. That is, the slew rate variable circuit 430 may control current output from the buck/boost controller 553 by turning on/off the switching module 711, and thus may deliver desired output current to the PMIC 440 or the battery 450.

FIG. 7B illustrates an example of a snubber circuit using the slew rate variable circuit 430.

Referring to FIG. 7B, the slew rate variable circuit 430 may control current supplied (e.g., In) from the buck/boost controller 553 via a switching module 761. The slew rate variable circuit 430 may control the switching module 761 according to the control signal 740 of the processor 120 depending on a state of the electronic device 400. For example, the snubber circuit may be a circuit used to avoid an abrupt change of voltage (or current) and to remove an undesired noise from an input signal (e.g., supply voltage). Therefore, the snubber circuit used as the slew rate variable circuit 430 may selectively turn on/off the switching module 761 according to the state of the electronic device 400, so that current provided via the buck/boost controller 553 can be partially leaked via a capacitor C2 and a resistor R6. For example, if receive sensitivity is decreased during charging, the slew rate variable circuit 430 may turn on the switching module 761 according to the control signal 740 of the processor 120. If the switching module 761 is on, an amount of current output from the charger IC 420 may be limited (or adjusted).

That is, if the switching module 761 is off, current supplied (e.g., In) from the buck/boost controller 553 may be entirely output (e.g., Out) to the PMIC 440 and the battery 450. If the switching module 761 is on, current output from the buck/boost controller 553 may be partially charged to the capacitor C2, and the charged current may be allowed to flow to a ground via the resistor R6. In this case, the current output from the charger IC 420 may be partially leaked by the slew rate variable circuit 430, and current which is not leaked (e.g., a part of current output from the buck/boost controller 553) may be output (e.g., Out) to the PMIC 440 or the battery 450. When an amount of current output from the charger IC 420 is adjusted, the amount of current provided to the PMIC 440 and the battery 450 may be adjusted.

The slew rate variable circuit 430 described in FIG. 7A and FIG. 7B is only for an example for facilitating understanding of the disclosure, and thus the slew rate variable circuit 430 is not limited to FIG. 7A and FIG. 7B.

Figure 8:
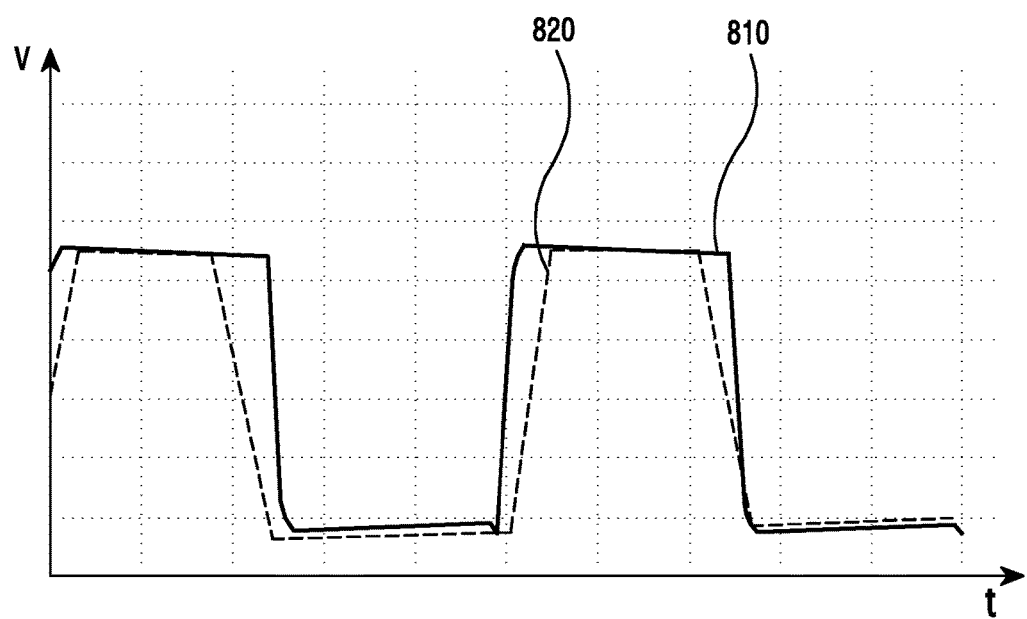
FIG. 8 is a graph illustrating an example of changing a slew rate according to various example embodiments.

FIG. 8 is a graph illustrating an example of changing a slew rate according to various example embodiments.

Referring to FIG. 8, a first waveform 810 (e.g., indicated by a solid line) indicates a voltage waveform output from the charger IC 420 according to a pre-set slew rate (e.g., 100% or 97%). In addition, a second waveform 820 (e.g., indicated by a dotted line) indicates a voltage waveform output from the charger IC 420 when the slew rate is changed (e.g., 95%, 90%). The second waveform 820 may have a lower slew rate than the first waveform 810.

According to various example embodiments, an electronic device may include a memory, a battery, a charging circuit for charging the battery using current supplied from a power supply device, a slew rate variable circuit electrically connected to the charging circuit, and a processor electrically connected to the memory, the battery, the charging circuit, or the slew rate variable circuit. The processor may be configured to control the charging circuit to control the charging of the battery, monitor a state of the electronic device during the battery is charged, and control the slew rate variable circuit on the basis of the state of the electronic device to change a slew rate related to the battery charging.

The state of the electronic device may include at least one of whether communication is in use, receive sensitivity strength, a temperature of the electronic device, and a battery charging level.

The electronic device may further include a Power Management Integrated Circuit (PMIC). The processor may be configured to change the slew rate to adjust current to be provided to the battery or the PMIC.

The slew rate variable circuit may be configured to be included inside the charging circuit.

The slew rate variable circuit may be configured to include a voltage regulator circuit or a snubber circuit.

The processor may be configured to perform a first charging process for providing current supplied from the power supply device to the battery according to a first slew rate on the basis of the state of the electronic device or a second charging process for providing the current supplied from the power supply device to the battery according to a second slew rate by decreasing the current.

The processor may be configured to change the slew rate to a third slew rate lower than the first slew rate and higher than the second slew rate if the temperature of the electronic device is lower than a first temperature and higher than a second temperature during the second charging process is performed.

The processor may be configured to maintain the second slew rate if the temperature of the electronic device is lower than the second temperature during the second charging process is performed.

The processor may be configured to maintain the second slew rate if the temperature of the electronic device is lower than the first temperature and higher than the second temperature during the second charging process is performed.

The processor may be configured to change the slew rate to a fourth slew rate lower than the second slew rate if the temperature of the electronic device is lower than the second temperature during the second charging process is performed.

The processor may be configured to change the slew rate to the third slew rate lower than the first slew rate and higher than the second slew rate if a battery charging level is higher than a pre-set level during the second charging process is performed.

The processor may be configured to change the slew rate to the first slew rate if the battery charging level is lower than the pre-set level during the second charging process is performed.

Hereinafter, an electronic device described in a flowchart may include at least one of the electronic device 101 of FIG. 1, the electronic device 201 of FIG. 2, and the electronic device 400 of FIG. 4. However, for convenience of explanation, it is described that each operation of the method is performed by the processor 120 of the electronic device 101 of FIG. 1. In addition, to facilitate understanding of the present disclosure, when describing constitutional elements similar or identical to those shown in FIG. 1, FIG. 2, and FIG. 4, a reference numeral of a corresponding constitutional element may be provided together.

Figure 9:
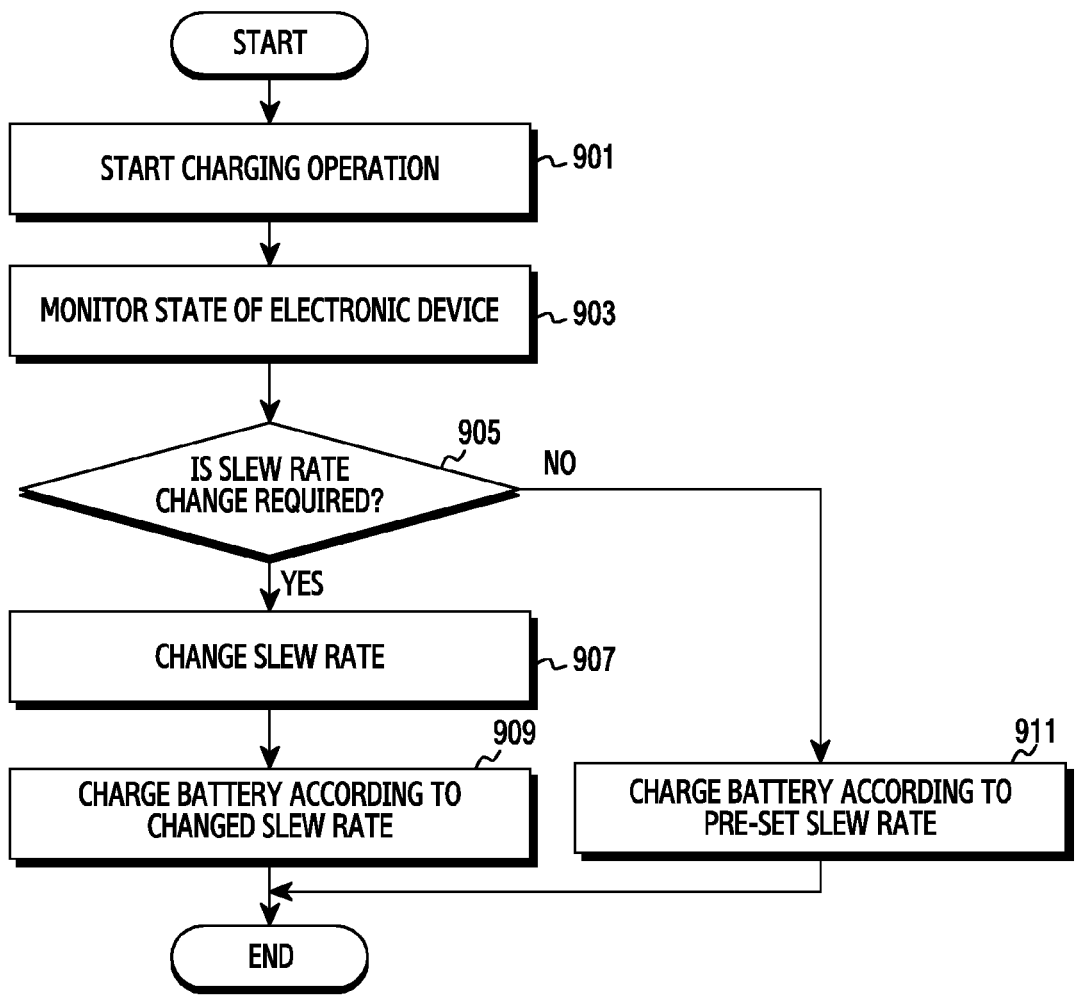
FIG. 9 is a flowchart illustrating an example method of operating an electronic device according to various example embodiments.

FIG. 9 is a flowchart illustrating an example method of operating an electronic device according to various example embodiments.

Referring to FIG. 9, in operation 901, the electronic device 101 (e.g., the processor 120) may start a charging operation. The processor 120 may detect whether the power supply device 410 is connected to an interface (e.g., the interface 270) of the electronic device 101. If it is determined that the power supply device 410 is connected to the interface of the electronic device 101, the charger IC 420 may operate in a charging mode. In case of the charging mode, the charger IC 420 may provide the PMIC 440 and the battery 450 with current supplied from the power supply device 410.

In operation 903, the electronic device 101 (e.g., the processor 120) may monitor a state of the electronic device 101. For example, the processor 120 may monitor the state of the electronic device 101 based on at least one of whether the communication interface 170 of the electronic device 101 is in use, receive sensitivity strength of the communication interface 170, a temperature of the electronic device 101, and a battery charging level. For example, the state monitoring of the electronic device 101 may be for changing a slew rate according to a situation of the electronic device 101 during the battery 450 is charged.

In operation 905, the electronic device 101 (e.g., the processor 120) may determine whether a change of the slew rate is necessary on the basis of the state of the electronic device 101. For example, the processor 120 may determine that the change of the slew rate is necessary if the communication interface 170 is in use (e.g., in a voice/video call), the receive sensitivity strength is lower than pre-set strength, the temperature of the electronic device 101 is higher than a pre-set temperature, or the battery charging level is higher than a pre-set level.

According to various example embodiments, the processor 120 may perform operation 907 if the change of the slew rate is necessary, and may perform operation 911 if the change of the slew rate is not necessary.

In operation 907, the electronic device 101 (e.g., the processor 120) may change the slew rate. The changing of the slew rate may be for allowing the slew rate variable circuit 430 to operate. For example, the processor 120 may turn on a switching module in the slew rate variable circuit 430 so that the slew rate variable circuit 430 operates. According to various example embodiments, the processor 120 may select an amount (or a level) of changing the slew rate on the basis of the state of the electronic device 101. For example, if receive sensitivity is divided into high, middle, and low, a slew rate change amount for a case where the receive sensitivity is 'middle' may be different from a slew rate change amount for a case where the receive sensitivity is 'low'.

In operation 909, the electronic device 101 (e.g., the processor 120) may charge the battery 450 according to the changed slew rate (e.g., a second slew rate, a third slew rate). For example, if the slew rate is changed to 90%, the charger IC 420 may decrease voltage supplied from the power supply device 410 and may provide it to the PMIC 440 or the battery 450. That is, operation 909 may be for changing a state of operation 901.

If the change of the slew rate is not necessary, in operation 911, the electronic device 101 (e.g., the processor 120) may charge the battery 450 on the basis of a pre-set slew rate (e.g., a first slew rate). That is, operation 911 may be for persistently maintaining the state of operation 901. The pre-set slew rate may correspond to a case where charging efficiency of the battery 450 is maximized, and may be a level optimized for the charging when implementing the electronic device 101. For example, the pre-set slew rate may be set variously such as 100%, 95%, or the like, and may be set to a default value in the electronic device 101. In case of charging with the pre-set slew rate, the battery 450 may be charged with a shorter time than a time of charging performed by changing the slew rate.

Figure 10:
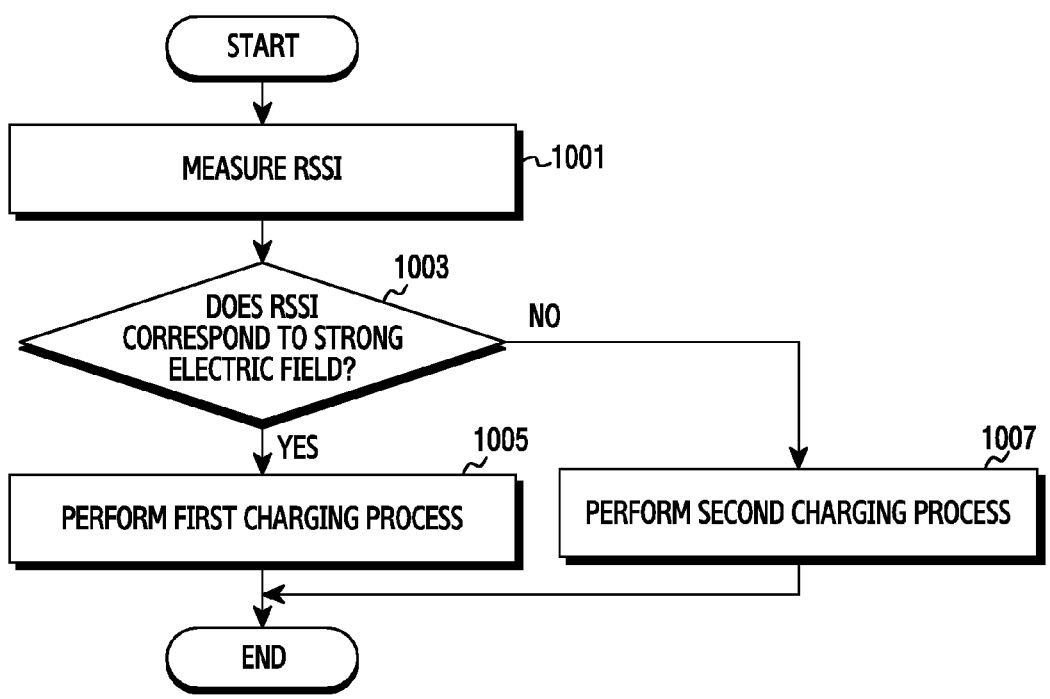
FIG. 10 is a flowchart illustrating an example method of controlling charging of an electronic device on the basis of receive sensitivity according to various example embodiments.

FIG. 10 is a flowchart illustrating an example method of controlling charging of an electronic device based on receive sensitivity according to various example embodiments.

Referring to FIG. 10, operations 1001 and 1003 of FIG. 10 may correspond to operations 903 and 905 of FIG. 9.

In operation 1001, the electronic device 101 (e.g., the processor 120) may measure Received Signal Strength Indication (RSSI). The RSSI may denote strength of a received signal. It can be said that the higher the RSSI, the better the receive sensitivity, and the lower the RSSI, the poorer the receive sensitivity. For example, if the receive sensitivity is good during a call is in progress, a user may clearly hear voice of the other party, whereas if the receive sensitivity is poor, the user may not clearly hear the voice of the other party and may hear a lot of noises. Therefore, the poor receive sensitivity means that it is poorly perceived by the user, and thus it is necessary to suppress a noise generation when the reception sensitivity is poor.

In operation 1003, the electronic device 101 (e.g., the processor 120) may determine whether the RSSI corresponds to a strong electric field. For example, the strong electric field may be when the RSSI is high, and a weak electric field may be when the RSSI is low. Although it is described in FIG. 10 that the RSSI is divided into two types (e.g., the strong electric field, the weak electronic field), the RSSI may also be divided into three or more types (e.g., good (high)/average (middle)/poor (low)).

According to various example embodiments, the processor 120 may perform operation 1005 if the RSSI corresponds to the strong electric field, and may perform operation 1007 if the RSSI corresponds to the weak electric field.

In operation 1005, the electronic device 101 (e.g., the processor 120) may perform a first charging process. The first charging process may include an operation of charging the battery 450 according to a pre-set slew rate (e.g., a first slew rate). Since operation 1005 is identical or similar to operation 911, detailed descriptions thereof will be omitted.

In operation 1007, the electronic device 101 (e.g., the processor 120) may perform a second charging process. The second charging process may include an operation of changing the slew rate and charging the battery 450 according to the changed slew rate. For example, the changing of the slew rate may imply changing from the first slew rate to a second slew rate (or a third slew rate). That is, operation 1007 may be for performing operations 907 and 909. Accordingly, since operation 1007 is identical or similar to operations 907 and 909, detailed descriptions thereof will be omitted.

Figure 11:
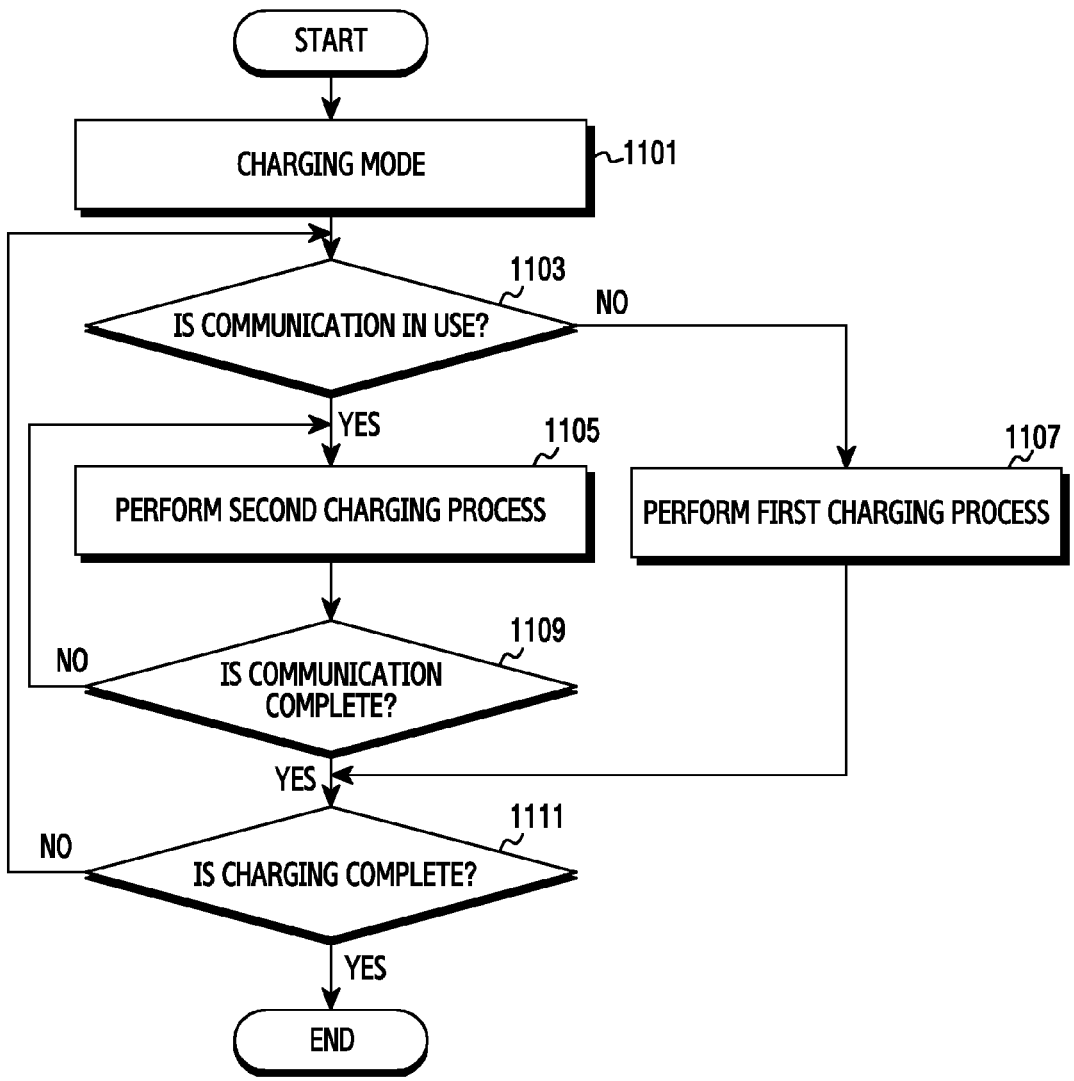
FIG. 11 is a flowchart illustrating an example method of controlling charging of an electronic device in association with a communication operation according to various example embodiments.

FIG. 11 is a flowchart illustrating an example method of controlling charging of an electronic device in association with a communication operation according to various example embodiments.

Referring to FIG. 11, in operation 1101, the electronic device 101 (e.g., the processor 120) may be in a charging mode. Herein, the charging mode may imply a state where the power supply device 410 is coupled to the electronic device 101 so that the charger IC 420 provides the PMIC 440 and the battery 450 with current (or voltage) supplied from the power supply device 410. Since operation 1101 is identical or similar to operation 901 of FIG. 9, detailed descriptions thereof will be omitted. In the charging mode, a first charging process may be performed according to a first slew rate.

In operation 1103, the electronic device 101 (e.g., the processor 120) may determine whether communication is in use. The communication in use may be a state where a call is in progress or a state where data is transmitted/received through a network. The state where data is transmitted/received through the network may imply that a signal is periodically transmitted/received with respect to a base station or that data is transmitted/received from a server via the base station or an Access Point (AP). However, the transmitting/receiving of the signal periodically with respect to the base station may be different from what a user perceives such as making a call, transmitting/receiving data, or the like. According to various example embodiments, in order to improve RSSI while increasing charging efficiency, the state where the signal is periodically transmitted/received with respect to the base station may be determined as that communication is not in use. Alternatively, data transmission/reception executed in a background of the electronic device 101 may be included in the communication in use or may not be included therein according to implementations.

According to various example embodiments, the processor 120 may perform operation 1105 if the communication is in use, and may perform operation 1107 if the communication is not in use.

If the communication is in use, in operation 1105, the electronic device 101 (e.g., the processor 120) may perform a second charging process. As described in operation 1007 of FIG. 10, the second charging process may include an operation of changing the first slew rate to a second slew rate (or a third slew rate) and charging the battery 450 according to the second slew rate. That is, the processor 120 may perform the second charging process irrespective of the RSSI during the communication is in use. That is, during the battery 450 is charged, if the user is in a call or transmits/receives data, the processor 120 may perform the second charging process. This is for preventing a noise from being generated during the communication is in use. When the second charging process is performed, the noise may be less generated than a case of charging with maximum charging efficiency, or may not be generated. In this case, since the noise generation caused by the charging is prevented, receive sensitivity perceived by the user may be good.

In operation 1109, the electronic device 101 (e.g., the processor 120) may determine whether the communication is complete. The processor 120 may monitor the communication interface 170 to detect whether the communication is complete. For example, the processor 120 may determine whether the communication is complete according to an amount of signal transmitted/received via the communication interface 170.

According to various example embodiments, the processor 120 may perform operation 1111 if the communication is complete, and may return to operation 1105 if the communication is not complete. In case of returning to operation 1105, the processor 120 may perform the second charging process until the communication is complete.

In operation 1111, the electronic device 101 (e.g., the processor 120) may determine whether the charging is complete. For example, the processor 120 may confirm whether it is charged to a capacity of the battery 450 on the basis of a battery gauge. If it is charged to the capacity of the battery 450, a battery level may be 100% (e.g., full charge).

According to various example embodiments, if the charging is complete, the processor 120 may end the procedure. If the charging is not complete, the processor 120 may return to operation 1103. In case of returning to operation 1103, the processor 120 may perform the first charging process or the second charging process according to whether the communication is in use until the charging is complete.

If the communication is not in use, in operation 1107, the electronic device 101 (e.g., the processor 120) may perform the first charging process. Operation 1107 may be similar or identical to operation 1105 of FIG. 10. During the battery 450 is charged, if the user is not in a call or does not transmit/receive data, the processor 120 may charge the battery 450 on the basis of a slew rate determined such that battery charging efficiency is maximized. That is, if the communication is not in use, the battery charging may be preferential over receive sensitivity perceived by the user.

Figure 12:
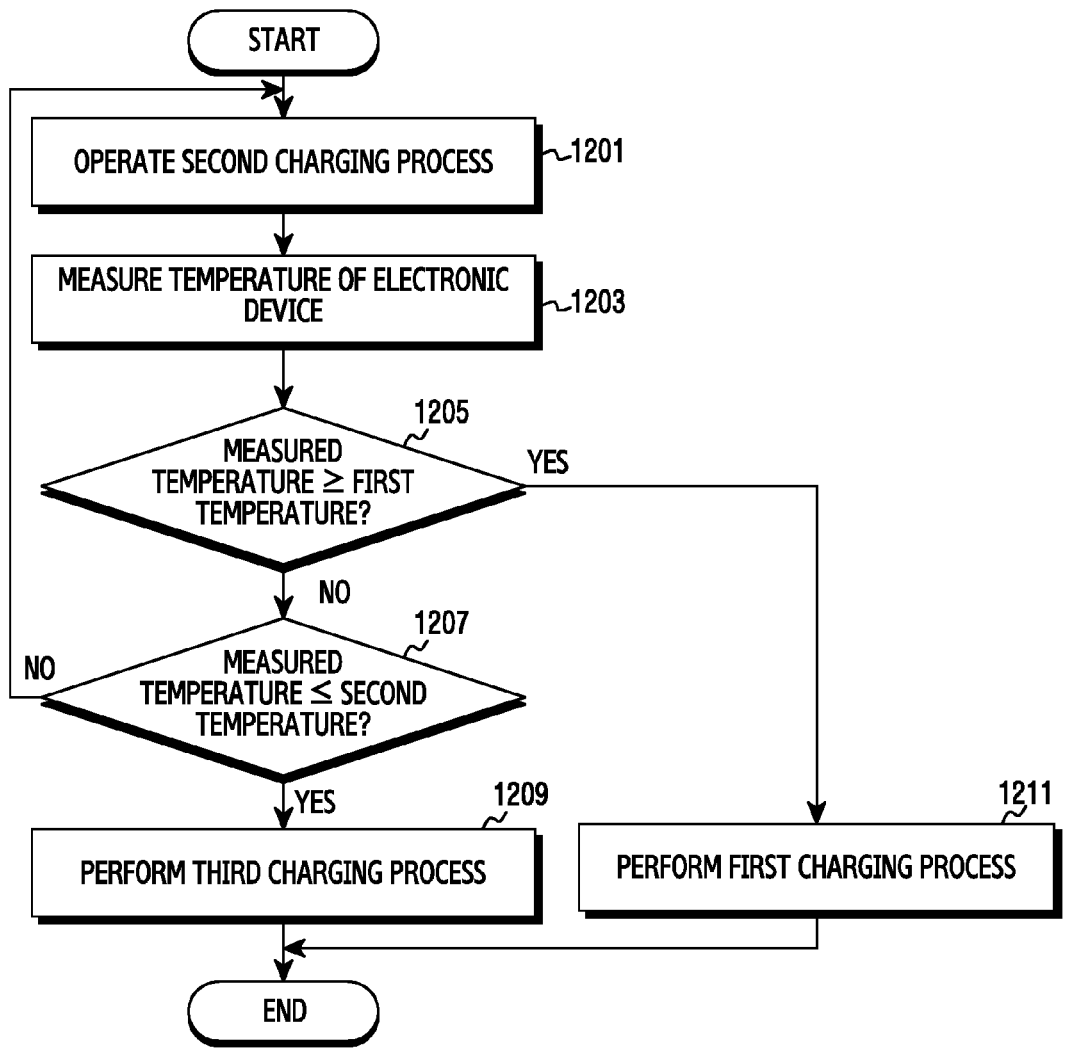
FIG. 12 is a flowchart illustrating an example method of controlling a slew rate of an electronic device in association with heat generation according to various example embodiments.

FIG. 12 is a flowchart illustrating an example method of controlling a slew rate of an electronic device in association with heat generation according to various example embodiments.

Referring to FIG. 12, in operation 1201, the electronic device (e.g., the processor 120) may perform a second charging process. The second charging process may include an operation of charging the battery 450 according to a second slew rate as described in operation 1007 of FIG. 10 and operation 1105 of FIG. 11.

In operation 1203, the electronic device 101 (e.g., the processor 120) may measure a temperature of the electronic device 101. For example, the processor 120 may use the temperature/humidity sensor 240J to measure the temperature of the electronic device 101. If the battery 450 is charged with the second charging process, a charging time may be increased and heat may be generated due to poor charging efficiency. Since an excessive temperature increase may have an adverse effect on a circuit, the processor 120 may persistently monitor the temperature of the electronic device 101 during the second charging process is performed.

In operation 1205, the electronic device 101 (e.g., the processor 120) may determine whether the measured temperature is higher than or equal to a first temperature. The first temperature may be a temperature for a case where heat is generated to an extent of having an adverse effect on the circuit of the electronic device 101. If the measured temperature is higher than or equal to the first temperature, the processor 120 may need to change the second charging process to a first charging process.

According to various example embodiments, the processor 120 may perform operation 1211 if the measured temperature is higher than or equal to the first temperature, and may perform operation 1207 if the measure temperature is lower than the first temperature.

If the measured temperature is higher than or equal to the first temperature, in operation 1211, the electronic device 101 (e.g., the processor 120) may perform the first charging process. That is, the processor 120 may change the second slew rate to a first slew rate. In this case, the processor 120 may perform the first charging process by providing control such that the slew rate variable circuit 430 does not operate.

If the measured temperature is lower than the first temperature, in operation 1207, the electronic device 101 (e.g., the processor 120) may determine whether the measured temperature is higher than or equal to a second temperature. The second temperature may be a temperature lower than the first temperature. For example, the second temperature may be a reference temperature for determining whether heat is generated in the electronic device and whether there is a need to change a slew rate even though there is no need to change to the first charging process.

According to various example embodiments, the processor 120 may perform operation 1209 if the measured temperature is higher than or equal to the second temperature, and may return to operation 1201 if the measured temperature is lower than the second temperature. In case of returning to operation 1201, the processor 120 may maintain the second charging process operation. That is, the processor 120 may maintain the second slew rate of the second charging process without having to change the slew rate. In case of returning to operation 1201, the processor 120 may perform operation 1203 to operation 1211 until the charging is complete.

If the measured temperature is higher than or equal to the second temperature, in operation 1209, the electronic device 101 (e.g., the processor 120) may perform a third charging process. The third charging process may be a process of performing charging with a third slew rate which is higher than the second slew rate of the second charging process and lower than the first slew rate of the first charging process. For example, if the first slew rate is 98%, the second slew rate may be 90% and the third slew rate may be 95%. This is only an example for facilitating understanding of the disclosure, and thus the slew rate is not limited to the above example. Therefore, in operation 1209, the processor 120 may perform the third charging process by changing the slew rate.

According to various example embodiments, the processor 120 may determine a fourth slew rate lower than the second slew rate. For example, if the first slew rate is 98%, the second slew rate may be 90% and the fourth slew rate may be 85%. In this case, operation 1207 may be for determining whether the temperature measured by the processor 120 is lower than the second temperature. The processor 120 may perform a fourth charging process in which charging is achieved according to the fourth slew rate if the measured temperature is lower than the second temperature, and may maintain the second charging process if the measured temperature is higher than or equal to the second temperature. That is, the second charging process may be performed when the measured temperature is lower than the first temperature and higher than the second temperature. The fourth charging process may be for performing charging according to the fourth slew rate lower than the second slew rate in case of lower than the second temperature.

According to various example embodiments, the memory 130 may store values for the first to fourth slew rates. In addition, the memory 130 may store a slew rate change condition (e.g., communication in progress, an RSSI, a temperature, a battery charging level, etc.) for changing the slew rate to the first to fourth slew rates. For example, the slew rate change condition may include at least one of cases where: (1) a communication interface of the electronic device is in use; (2) the receive sensitivity strength is less than or equal to pre-set strength; (3) the temperature of the electronic device is higher than or equal to a pre-set temperature; and (4) the battery charging level is lower than or equal to a pre-set level. The values for the first to fourth slew rates or the slew rate change condition may be set to a default value in the electronic device 101, or may be set by the user.

Figure 13:
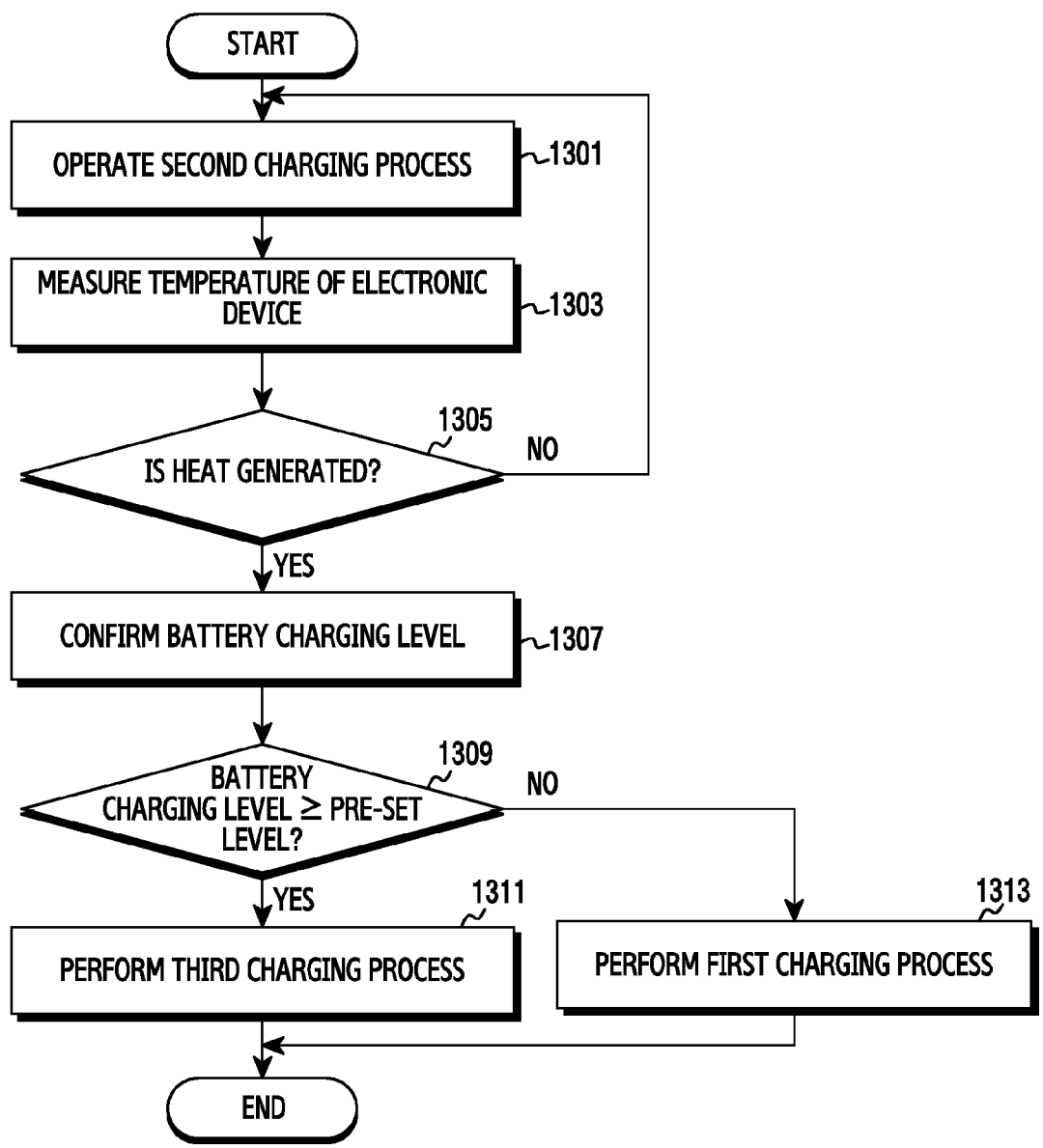
FIG. 13 is a flowchart illustrating an example method of controlling a slew rate of an electronic device according to various example embodiments.

FIG. 13 is a flowchart illustrating an example method of controlling a slew rate of an electronic device according to various example embodiments.

Referring to FIG. 13, since operation 1301 and operation 1303 are identical or similar to operation 1201 and operation 1203 of FIG. 12, detailed descriptions thereof will be omitted.

In operation 1305, the electronic device 101 (e.g., the processor 120) may determine whether heat is generated in the electronic device 101 on the basis of a measured temperature. For example, the processor 120 may determine whether the measured temperature is a pre-set temperature, and if the measured temperature is higher than or equal to the pre-set temperature, may determine that heat is generated. The pre-set temperature may be the first temperature or second temperature described in FIG. 12, or may be a temperature (e.g., a third temperature) lower than the first temperature and higher than the second temperature. The pre-set temperature may be set to a default value in the electronic device 101, or may be set by a user.

In operation 1307, the electronic device 101 (e.g., the processor 120) may confirm a battery charging level. For example, the processor 120 may confirm a battery gauge to confirm a charging level (e.g., 50%, 80%) of the battery 450.

In operation 1309, the electronic device 101 (e.g., the processor 120) may determine whether the battery charging level is higher than or equal to a pre-set level. The pre-set level may be set to a default value in the electronic device 101, or may be set by the user. For example, the pre-set level may be 50% to 80%.

According to various example embodiments, the processor 120 may perform operation 1311 if the battery charging level is higher than or equal to the pre-set level, and may perform operation 1313 if the battery charging level is lower than the pre-set level.

In operation 1311, the electronic device 101 (e.g., the processor 120) may perform a third charging process. The third charging process may use a slew rate higher than the slew rate of a second charging process and lower than a slew rate of a first charging process. Operation 1311 may be identical or similar to operation 1209 of FIG. 12. For example, the battery charging level may exceed 50% (or 80%) and thus a noise prevention operation may be preferential over battery charging. In this case, the processor 120 may perform the third charging process to improve battery efficiency while improving receive sensitivity by changing the slew rate.

In operation 1313, the electronic device 101 (e.g., the processor 120) may perform the first charging process. For example, since the battery charging level does not exceed 50% (or 80%), the battery charging may be preferential over the noise prevention. In this case, the processor 120 may change the slew rate to a pre-set slew rate to perform the first charging process so that battery charging efficiency can be increased.

Figure 14:
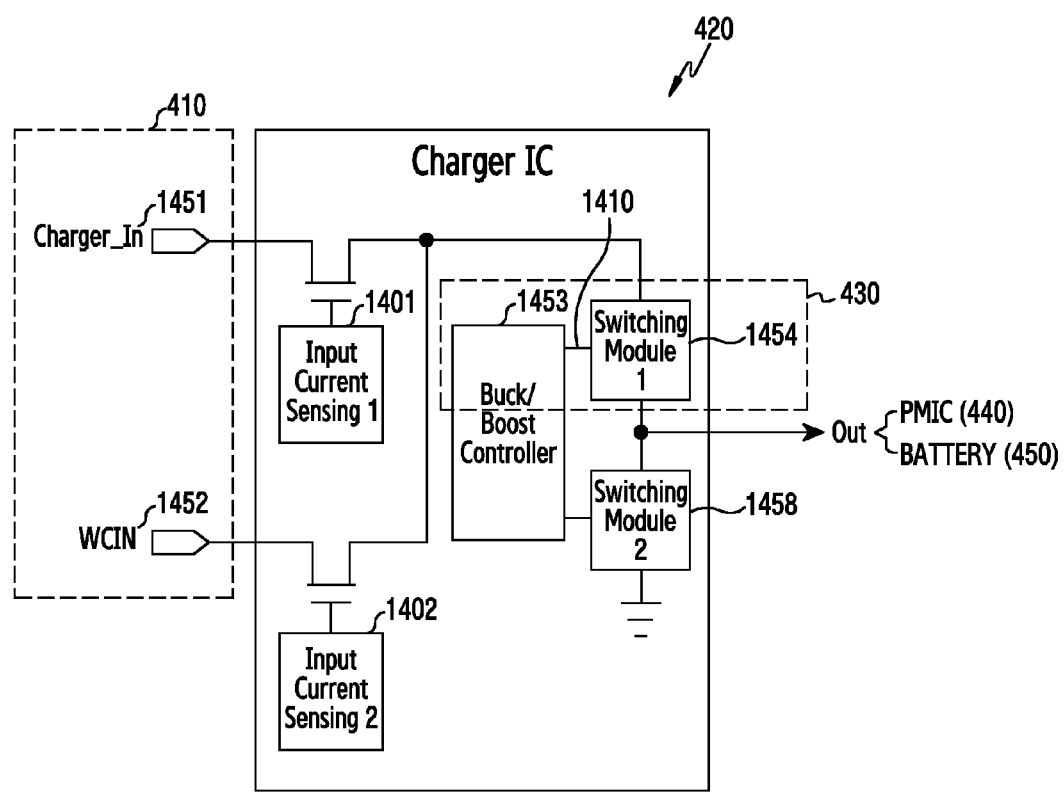
FIG. 14 is a diagram illustrating another example of a charger IC according to various example embodiments.

FIG. 14 is a diagram illustrating another example of a charger IC according to various example embodiments.

Referring to FIG. 14, the charger IC 420 may include a charger_in 1451, an input current sensing-1 circuit 1401, a WCIN 1452, an input current sensing-2 circuit 1402, a buck/boost controller 1453, a switching module-1 including a switching circuit 1454, and a switching module-2 including a switching circuit 1458. Since the charger IC 420 of FIG. 14 is identical or similar to the charger IC 420 of FIG. 5, detailed descriptions thereof will be omitted.

The charger_in 1451 may be a connection node for forming an electrical path with respect to the power supply device 410 (e.g., a wired power supply device). The WCIN 1452 may be a connection node for forming an electrical path with respect to the power supply device 410 (e.g., a wireless power supply device).

The buck/boost controller 1453 may convert current supplied from the power supply device 410 to DC current (or voltage) while turning on/off the switching module-1 1454 and the switching module-2 1458. For example, the switching module-1 1454 and the switching module-2 1458 may be constructed of a P-channel MOSFET.

According to various example embodiments, the slew rate variable circuit 430 may be included inside the buck/boost controller 1453 in the charger IC 420, or may be implemented on the switching module-1 1454 and a portion of the buck/boost controller 1453. Current output from the slew rate variable circuit 430 may be provided to the PMIC 440 and the battery 450.

Hereinafter, an example of the slew rate variable circuit 430 of FIG. 14 is described.

FIGS. 15A, 15B, 15C and 15D are diagrams illustrating examples of a slew rate variable circuit according to various example embodiments.

FIG. 15A illustrates an example of the slew rate variable circuit 430 using a transistor.

Referring to FIG. 15A, the slew rate variable circuit 430 may use a P-channel MOSFET 1501 to comprise the switching module-1 1454, and may use a resistor-2 R2 and a transistor TR1 to comprise a portion of the buck/boost controller 1453. For example, the slew rate variable circuit 430 may turn on/off the P-channel MOSFET 1501 by turning on/off the transistor TR1 inside the buck/boost controller 1453 according to a control signal of the processor 120. The slew rate variable circuit 430 may adjust a duty cycle for turning on/off the P-channel MOSFET 1501 by using the transistor-1 TR1, and thus may create desired output current. For example, the slew rate variable circuit 430 may deliver the desired output current (e.g., Out) to the PMIC 440 and the battery 450 by turning on/off the P-channel MOSFET 1501 according to a switching control signal input 1505 of the processor 120.

Figure 15B:
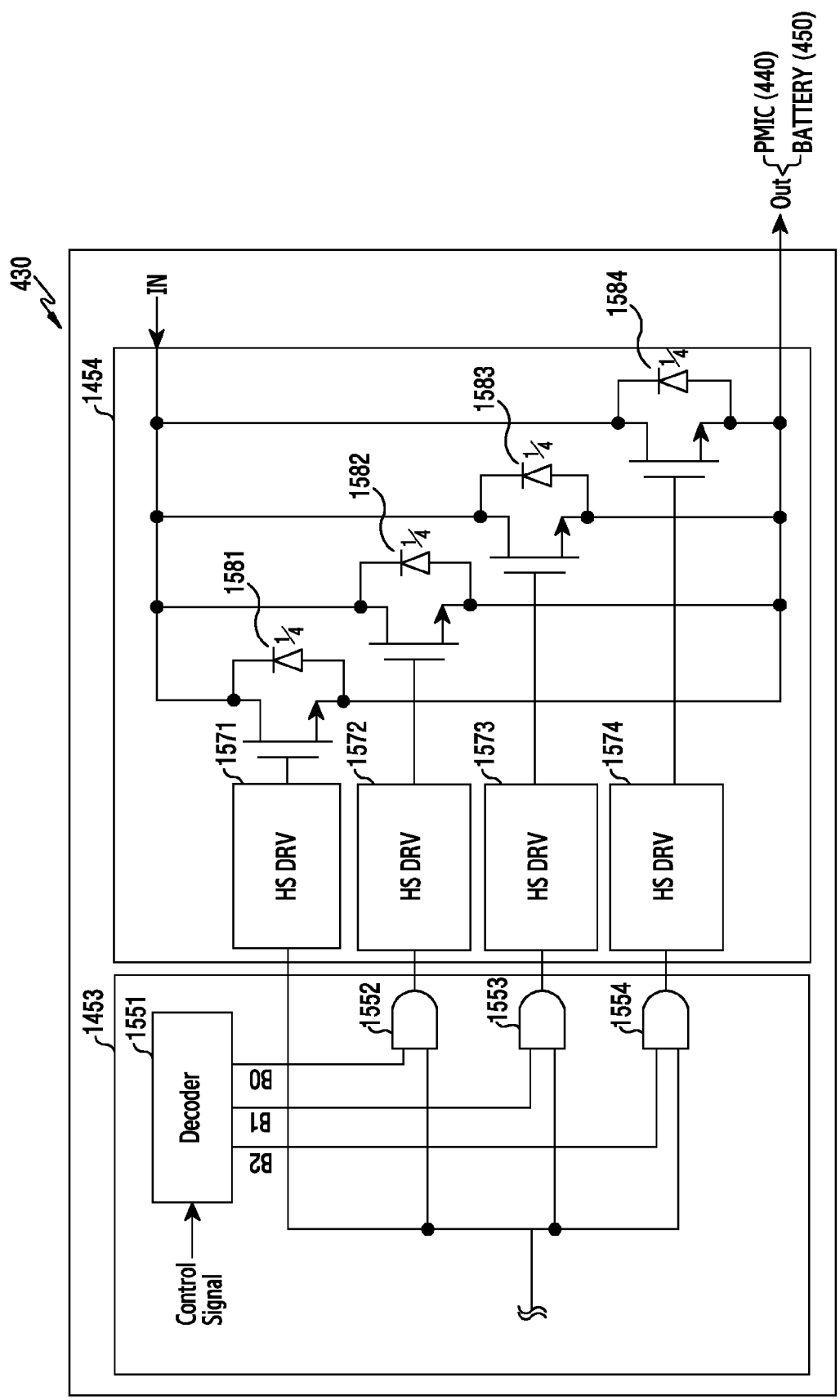

FIG. 15B illustrates an example of the slew rate variable circuit 430 using a plurality of logic circuits and a plurality of transistors.

Referring to FIG. 15B, the slew rate variable circuit 430 may use a plurality of High Side Drivers (HS DRVs) 1571 to 1574 and a plurality of high side MOSFETs 1581 to 1584 to constitute the switching module-1 1454, and may use a decoder 1551 and a plurality of logic circuits 1552 to 1554 to constitute a portion of the buck/boost controller 1453. For example, the slew rate variable circuit 430 may output current supplied (e.g., In) from the power supply device 410 to the PMIC 440 and the battery 450 according to a control signal of the processor 120. That is, the slew rate variable circuit 430 may control an output value of a decoder 1551 inside the buck/boost controller 1453 to control an output of the buck/boost controller 1453. The plurality of logic circuits 1552 to 1554 may determine an output value by using an output value of the decoder 1551 and an output value of the buck/boost controller 1453. For example, the plurality of logic circuits 1552 to 1554 may be an AND circuit (a logical product circuit) which outputs '1' when the output value of the decoder 1551 and the output value of the buck/boost controller 1453 are both '1'.

For example, if charging current is intended to be output with a pre-set slew rate (e.g., a first slew rate), the slew rate variable circuit 430 may provide control to drive the HS DRV-1 1571. The HS DRV-1 1571 may turn on/off the high side MOSFET-1 1581 by using the output value of the buck/boost controller 1453. The slew rate variable circuit 430 may turn on the high side MOSFET-1 1581 by means of the HS DRV-1 1571, and thus may deliver current output from the buck/boost controller 1453 to the PMIC 440 and the battery 450.

If charging current is intended to be output with a second slew rate, the slew rate variable circuit 430 may provide control to drive the HS DRV-1 1571 and the HS DRV-2 1572. The slew rate variable circuit 430 may provide control such that an output value B0 of the decoder 1551 is output as '1' according to the control signal of the processor 120. Since the output value of the decoder 1551 and the output value of the buck/boost controller 1453 are both '1', the first logic circuit 1552 may provide control such that '1' is output. In this case, the HS DRV-2 1572 may be driven to turn on the high side MOSFET-2 1582. The HS DRV-2 1572 may turn on/off the high side MOSFET-2 1582 according to the output value B0 of the decoder 1551 and the output value from the buck/boost controller 1453. The slew rate variable circuit 430 may turn on the high side MOSFET-1 1581 and the high side MOSFET-2 1582, and thus may control current output from the buck/boost controller 1453 with the second slew rate to deliver it to the PMIC 440 and the battery 450.

If charging current is intended to be output with a third slew rate, the slew rate variable circuit 430 may provide control to drive the HS DRV-1 1571 and the HS DRV-3 1573. The slew rate variable circuit 430 may provide control such that output values B0 and B1 of the decoder 1551 are output as '1' so that the HS DRV-2 1572 and the HS DRV-3 1573 are driven according to the control signal of the processor 120. Since the output value of the decoder 1551 and the output value of the buck/boost controller 1453 are both '1', the first logic circuit 1552 may provide control such that '1' is output. In this case, the HS DRV-2 1572 may be driven to turn on the high side MOSFET-2 1582. In addition, since the output value of the decoder 1551 and the output value of the buck controller are both '1', the second logic circuit 1553 may provide control such that '1' is output. In this case, the HS DRV-3 1573 may be driven to turn on the high side MOSFET-3 1583. The HS DRV-3 1573 may turn on/off the high side MOSFET-3 1583 according to the output value B1 of the decoder 1551 and the buck control inside the buck/boost controller 1453. The slew rate variable circuit 430 may turn on the high side MOSFET-1 1581 and the high side MOSFET-3 1583, and thus may control current output from the buck/boost controller 1453 with the third slew rate to deliver it to the PMIC 440 and the battery 450.

If charging current is intended to be output with a fourth slew rate, the slew rate variable circuit 430 may provide control to drive the HS DRV-1 1571 and the HS DRV-4 1574. The slew rate variable circuit 430 may provide control such that output values B0, B1, and B2 of the decoder 1551 are all output as '1' so that the HS DRV-2 1572 to the HS DRV-4 1574 are driven. Since the output values B0, B1, and B2 of the decoder 1551 and the output value of the buck control are all '1', the first logic circuit 1552 to the third logic circuit 1554 may provide control such that '1' is output. In this case, the HS DRV-2 1572 to the HS DRV-4 1574 may be driven to turn on the high side MOSFET-2 1582 to the high side MOSFET-4 1584. The slew rate variable circuit 430 may turn on the high side MOSFET-1 1581 and the high side MOSFET-4 1584, and thus may control current output from the buck/boost controller 1453 with the fourth slew rate to deliver it to the PMIC 440 and the battery 450.

Figure 15C:
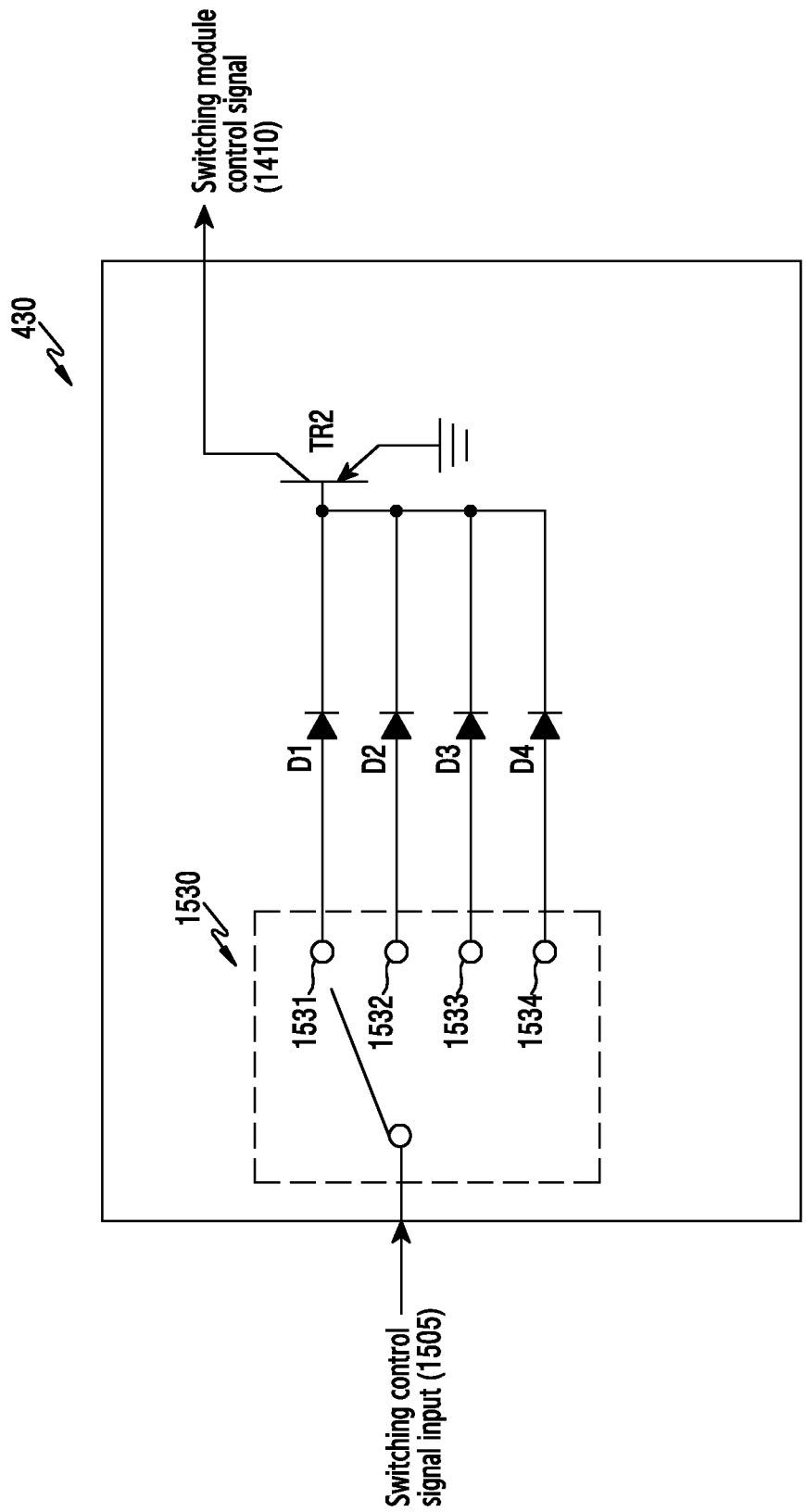

FIG. 15C illustrates an example of the slew rate variable circuit 430 using a diode.

Referring to FIG. 15C, the slew rate variable circuit 430 may be constructed of a switching module 1530, a plurality of diodes D1 to D4, and a transistor-2 TR2. The slew rate variable circuit 430 may be included in the buck/boost controller 553 to provide control such that different current values (or voltage values) are output by using the switching module 1530. The switching module 1530 may include one or more nodes 1531 to 1534 capable of outputting different current values. Each of the nodes 1531 to 1534 may differently adjust a slew rate. For example, the first node 1531 may control a current value (or a voltage value) such that the slew rate is 95%, the second node 1532 may control the current value such that the slew rate is 90%, the third node 1533 may control the current value such that the slew rate is 85%, and the fourth node 1534 may control the current value such that the slew rate is 80%, The slew rate variable circuit 430 may control the switching module 1530 according to the switching control signal input 1505 of the processor 120 depending on a state of the electronic device 400. The switching module 1530 may connect an output node to each of the nodes 1531 to 1534 according to the switching control signal input 1505. The slew rate variable circuit 430 may control the switching module 1530 according to the switching control signal input 1505, and thus may output desired output current as a switching module control signal 1410.

The slew rate variable circuit 430 may selectively perform switching on each of the nodes 1531 to 1534 according to the switching control signal input 1505, and thus may output different current values while the transistor-2 TR2 is on/off. For example, if the switching module 1530 is connected to the first node 1531, an electrical path is formed through the diode-1 D1 so that first output current is output by the first node 1531. If the switching module 1530 is connected to the second node 1532, an electrical path is formed through the diode-2 D2 so that second output current is output by the second node 1532. If the switching module 1530 is connected to the third node 1533, an electrical path is formed through the diode-3 D3 so that third output current is output by the third node 1533. If the switching module 1530 is connected to the fourth node 1534, an electrical path is formed through the diode-4 D4 so that fourth output current is output by the fourth node 1534.

Figure 15D:
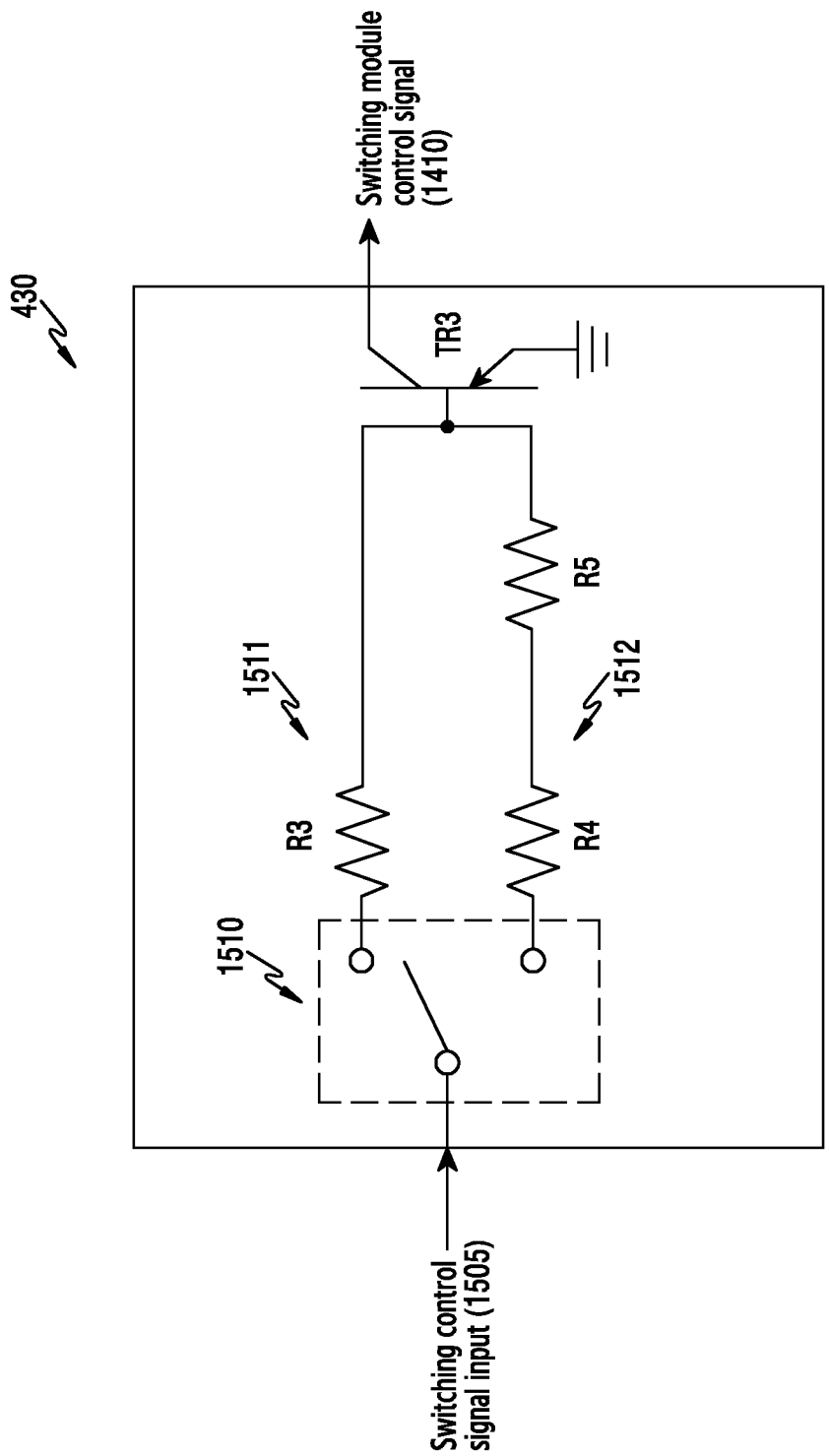

FIG. 15D illustrates an example of the slew rate variable circuit 430 using a resistor.

Referring to FIG. 15D, the slew rate variable circuit 430 may output the switching module control signal 1410 through different paths 1511 and 1512 according to the switching control signal input 1505. For example, the slew rate variable circuit 430 may output the switching module control signal 1410 through the first path 1511 or the second path 1512 by controlling the switching module 1510 according to the switching control signal input 1505 of the processor 120 depending on a state of the electronic device 400. The first path 1511 may include a first resistor R3, and the second path 1512 may include a second resistor R4 and a third resistor R5. The first resistor R3 to the third resistor R5 may have different resistance values or the same value. Accordingly, since a resistance (e.g., R3) of a resistor existing on the first path 1511 is different from a resistance (e.g., R4+R5) of a resistor existing on the second path 1512, a value of current that flows on each path may vary (e.g., Ohm's law (V (voltage)=I (current)×R (resistance)). By reference, the slew rate variable circuit 430 may selectively output current through the first path 1511 or the second path 1512 according to the switching control signal input 1505, and thus a transistor-3 TR3 is on/off to output different current values.

According to various example embodiments, a method of operating an electronic device may include monitoring a state of the electronic device during a battery of the electronic device is charged, determining whether the state of the electronic device corresponds to a slew rate change condition, and if the state corresponds to the slew rate change condition, changing the slew rate related to the battery charging.

The state of the electronic device may include at least one of whether communication is in use, receive sensitivity strength, a temperature of the electronic device, and a battery charging level.

The slew rate change condition may include at least one of cases where: (1) a communication interface of the electronic device is in use; (2) the receive sensitivity strength is less than or equal to pre-set strength; (3) the temperature of the electronic device is higher than or equal to a pre-set temperature; and (4) the battery charging level is lower than or equal to a pre-set level.

The changing may include adjusting current to be provided to the battery or the PMIC by using a slew rate variable circuit of the electronic device.

The method may further include performing a first charging process for providing current supplied from the power supply device to the battery according to a first slew rate, or performing a second charging process for providing the current supplied from the power supply device to the battery according to a second slew rate by decreasing the current.

The method may further include changing the slew rate to a third slew rate lower than the first slew rate and higher than the second slew rate if the temperature of the electronic device is lower than a first temperature and higher than a second temperature during the second charging process is performed, or maintaining the second slew rate if the temperature of the electronic device is lower than the second temperature during the second charging process is performed.

The method may further include maintaining the second slew rate if the temperature of the electronic device is lower than the first temperature and higher than the second temperature during the second charging process is performed, or changing the slew rate to a fourth slew rate lower than the second slew rate if the temperature of the electronic device is lower than the second temperature during the second charging process is performed.

The method may further include changing the slew rate to the third slew rate lower than the first slew rate and higher than the second slew rate if a battery charging level is higher than a pre-set level during the second charging process is performed, or changing the slew rate to the first slew rate if the battery charging level is lower than the pre-set level during the second charging process is performed.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Various embodiments disclosed herein are provided merely to easily describe technical details of the present disclosure and to help the understanding of the present disclosure, and are not intended to limit the scope of the present disclosure. Therefore, it should be understood that all modifications and changes or modified and changed forms based on the technical idea of the present disclosure fall within the scope of the present disclosure.

What is claimed is:

1. An electronic device comprising:
a memory configured to store instructions;
a communication circuit;
a battery;
a charging circuit configured to charge the battery using a current supplied from an external device;
a slew rate variable circuit electrically connected to the charging circuit; and
a processor electrically connected to the memory, the communication circuit, the battery, the charging circuit, and the slew rate variable circuit, wherein the processor is configured to execute the stored instructions to:
charge the battery using the charging circuit, based on a first slew rate;
while charging the battery based on the first slew rate, receive a signal using the communication circuit;
in response to receiving the signal, identify a reception quality of the signal, while charging the battery based on the first slew rate;
in response to identification of the reception quality, identify that the reception quality of the signal is outside of a designated range; and in response to the identification that the reception quality of the signal is out of the designated range, control the slew rate variable circuit to change the first slew rate to a second slew rate, and charge the battery using the charging circuit, based on the second slew rate.

2. The electronic device of claim 1, further comprising a Power Management Integrated Circuit (PMIC), wherein the processor is configured to change the first slew rate to adjust current provided to the battery or the PMIC.

3. The electronic device of claim 1, wherein the slew rate variable circuit is configured to be included inside the charging circuit.

4. The electronic device of claim 1, wherein the slew rate variable circuit comprises a voltage regulator circuit or a snubber circuit.

5. The electronic device of claim 1, wherein the reception quality indicates Received signal strength indicator (RSSI).

6. The electronic device of claim 1, wherein the second slew rate is less than the first slew rate.

7. The electronic device of claim 1, wherein the processor is configured to execute the stored instructions to:
control the slew rate variable circuit to change the first slew rate to a second slew rate by decreasing a current to be inputted the battery.

8. The electronic device of claim 1, wherein the processor is configured to execute the stored instructions to:
control the slew rate variable circuit to change the first slew rate to another slew rate, based on a temperature of the electronic device.

9. The electronic device of claim 1, wherein the processor is configured to execute the stored instructions to:
determine whether the communication circuit is in use for receiving a voice signal from another external device or not; and
control the slew rate variable circuit to change the first slew rate to another slew rate, based on the determination that the communication circuit is in use for receiving the voice signal.

10. The electronic device of claim 1, wherein the processor is configured to execute the stored instructions to:
control the slew rate variable circuit to change the first slew rate to another slew rate, based on battery charging level being outside of a reference charging level.

11. A method of operating an electronic device, the method comprising:
charging a battery of the electronic device using a current from an external device, based on a first slew rate;
while charging the battery based on the first slew rate, receiving a signal using a communication circuit of the electronic device;
in response to receiving the signal, identifying a reception quality of the signal, while charging the battery based on the first slew rate;
in response to identification of the reception quality, identify that the reception quality of the signal is outside of a designated range; and
in response to the identification that the reception quality of the signal is outside of the designated range, changing the first slew rate to a second slew rate, and charge the battery using the charging circuit, based on the second slew rate.

12. The method of claim 11, wherein the reception quality indicates Received signal strength indicator (RSSI).

13. The method of claim 11, wherein the changing of the first slew rate further comprises:
changing the first slew rate to a second slew rate by decreasing a current to be inputted the battery.

14. The method of claim 11, further comprising:
changing the first slew rate to another slew rate, based on a temperature of the electronic device.

15. The method of claim 11, further comprising:
determining whether the communication circuit is in use for receiving a voice signal from another external device or not; and
changing the first slew rate to another slew rate, based on the determination that the communication circuit is in use for receiving the voice signal.

16. The method of claim 11, further comprising:
changing the first slew rate to another slew rate, based on battery charging level being outside of a reference charging level.

17. The method of claim 11, wherein the second slew rate is less than the first slew rate.

* * * * *